US011001511B2

(12) United States Patent
Nyberg et al.

(10) Patent No.: US 11,001,511 B2
(45) Date of Patent: May 11, 2021

(54) ELECTROCHEMICAL ION EXCHANGE TREATMENT OF FLUIDS

(71) Applicant: ERIX Solutions, LLC, Mountain View, CA (US)

(72) Inventors: Eric David Nyberg, Belmont, CA (US); Dennis Kwok, Pasadena, CA (US); Alessandro Manigrassi, Sala Bolognese (IT); Shiang Fu, Cupertino, CA (US)

(73) Assignee: Erix Solutions Corporation, San Carlos, CA (US)

( * ) Notice: Subject to any disclaimer, the term of this patent is extended or adjusted under 35 U.S.C. 154(b) by 428 days.

(21) Appl. No.: 16/001,792

(22) Filed: Jun. 6, 2018

(65) Prior Publication Data

US 2018/0354820 A1    Dec. 13, 2018

Related U.S. Application Data

(60) Provisional application No. 62/516,612, filed on Jun. 7, 2017.

(51) Int. Cl.
*C02F 1/46* (2006.01)
*C02F 1/469* (2006.01)
(Continued)

(52) U.S. Cl.
CPC .......... *C02F 1/4695* (2013.01); *B01D 61/445* (2013.01); *B01D 61/48* (2013.01);
(Continued)

(58) Field of Classification Search
CPC .......... C02F 1/4695; C02F 2201/46115; C02F 2201/46125; C02F 2201/006;
(Continued)

(56) References Cited

U.S. PATENT DOCUMENTS 5,061,896 A    10/1991    Schmidt
5,779,891 A    7/1998    Andelman
(Continued)

OTHER PUBLICATIONS

PCT/US18/36249, International Search Report, dated Sep. 27, 2018.

*Primary Examiner* — Arun S Phasge
(74) *Attorney, Agent, or Firm* — Jill A. Jacobson; FisherBroyles, LLP

(57) ABSTRACT

A fluid treatment apparatus is constructed from at least one electrochemical cell including a bipolar ion exchange membrane and having a single output orifice to deliver treated fluid. The apparatus may employ a power supply transformer featuring a magnetic dispersion bridge to regulate the magnetic flux to secondary coils, thereby limiting the current delivered to the load and protecting the apparatus from over-current damage. The cell includes a membrane assembly which incorporates both the inner and outer electrodes to provide repeatable assembly and service, as well as reliable performance. The apparatus will provide continuous fluid treatment when designed with at least two stages, each stage including at least one cell, in which one stage is treating influent solution and another stage is regenerating. A method to operate these apparatus includes the steps of deionizing influent solution without interruption, halting deionization water flow and removing power from the deionization cells, flushing the liquid between membrane layers to the drain outlet, initiating regeneration power, and initiating regeneration flow.

8 Claims, 9 Drawing Sheets

(51) Int. Cl.
  *H01F 27/28* (2006.01)
  *H01F 27/24* (2006.01)
  *B01D 61/48* (2006.01)
  *B01D 61/44* (2006.01)
  *B01D 65/02* (2006.01)
  *H01F 30/04* (2006.01)
  *B01J 49/30* (2017.01)
  *B01J 49/20* (2017.01)
  *B01J 47/12* (2017.01)

(52) U.S. Cl.
  CPC .............. *B01D 65/02* (2013.01); *B01J 47/12* (2013.01); *B01J 49/20* (2017.01); *B01J 49/30* (2017.01); *H01F 27/24* (2013.01); *H01F 27/28* (2013.01); *H01F 30/04* (2013.01); *B01D 2313/345* (2013.01); *B01D 2313/365* (2013.01); *B01D 2321/223* (2013.01); *C02F 2201/006* (2013.01); *C02F 2201/4616* (2013.01); *C02F 2201/46115* (2013.01); *C02F 2201/46125* (2013.01); *C02F 2303/16* (2013.01)

(58) Field of Classification Search
  CPC .......... C02F 2201/4616; C02F 2303/16; H01F 30/04; H01F 27/28; H01F 27/24; B01J 49/30; B01J 49/20; B01J 47/12; B01D 61/48; B01D 61/445; B01D 65/02; B01D 2313/365; B01D 2321/223; B01D 2313/345

See application file for complete search history.

(56) References Cited

U.S. PATENT DOCUMENTS

| | | |
|---|---|---|
| 5,788,812 A | 8/1998 | Agar et al. |
| 7,344,629 B2 | 3/2008 | Smith et al. |
| 7,780,833 B2 | 8/2010 | Hawkins et al. |
| 7,959,780 B2 | 6/2011 | Hawkins et al. |
| 8,562,803 B2 | 10/2013 | Nyberg et al. |
| 9,531,287 B1 | 12/2016 | Johnson |
| 2006/0016685 A1* | 1/2006 | Hawkins ............... C02F 1/4695 204/296 |
| 2006/0138997 A1 | 6/2006 | Holmes et al. |
| 2009/0200290 A1 | 8/2009 | Cardinal et al. |
| 2012/0299684 A1 | 11/2012 | Won |

* cited by examiner

FIG. 1A
FIG 1B
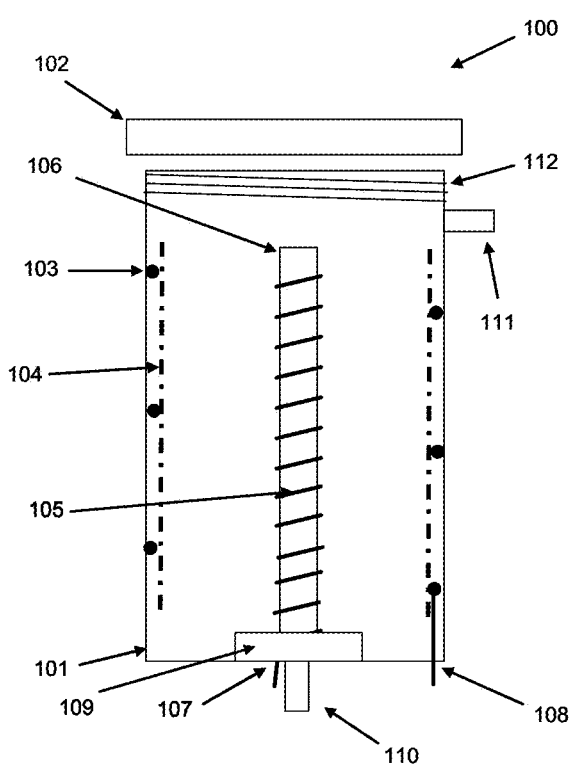
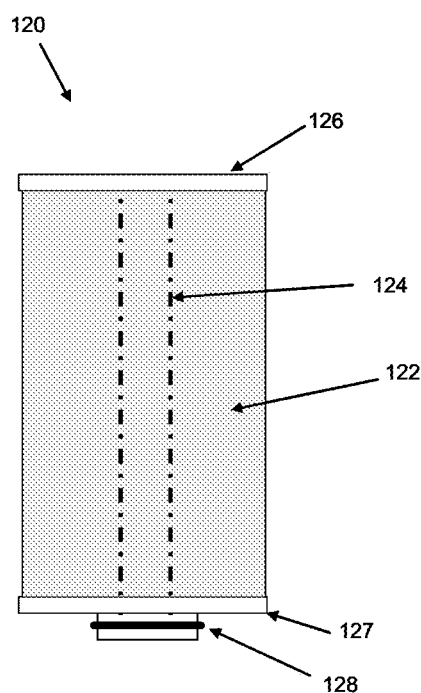

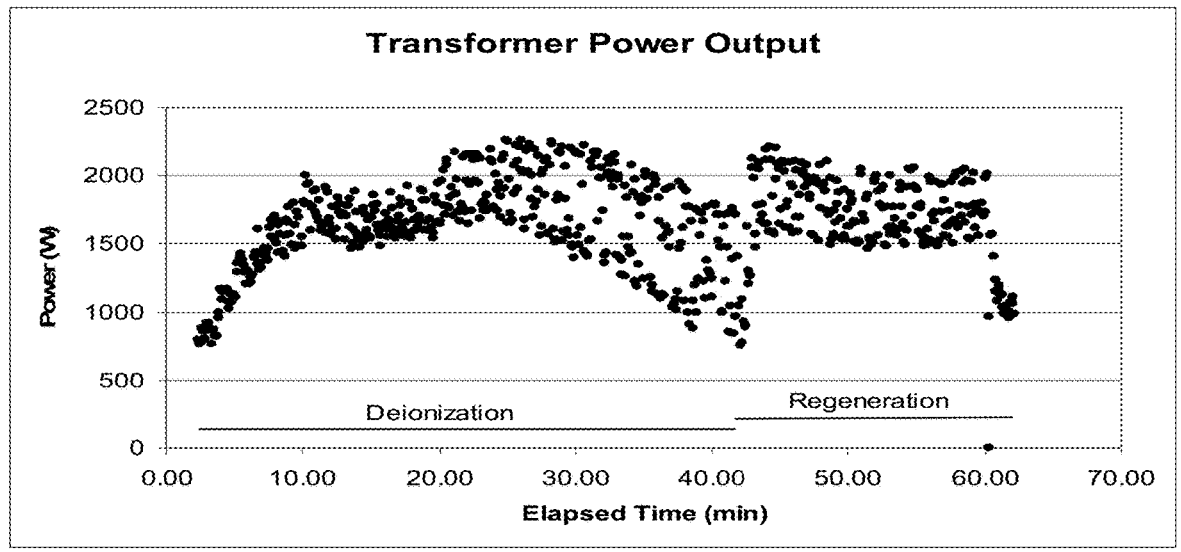
FIG. 13
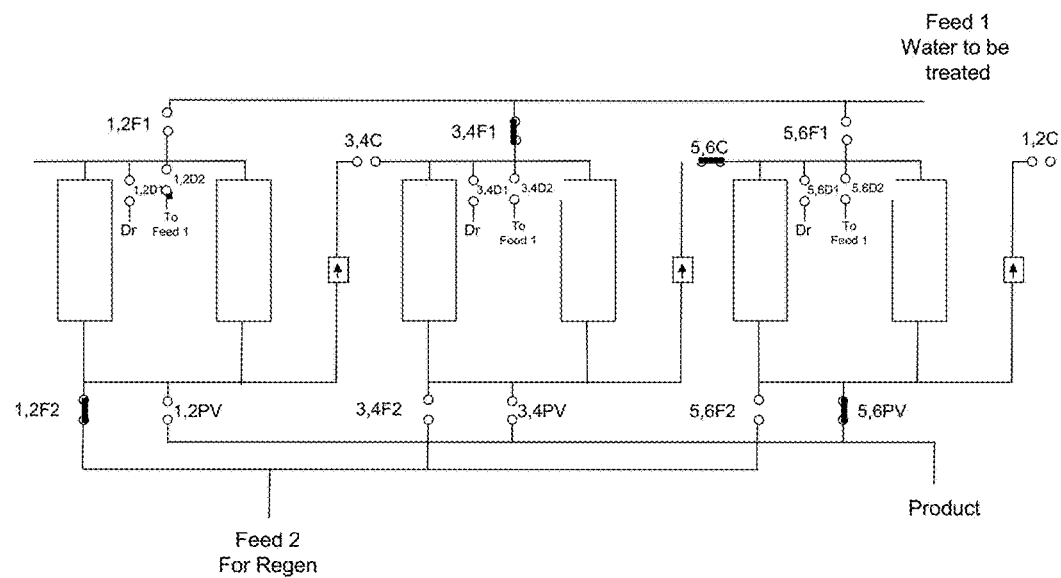

ELECTROCHEMICAL ION EXCHANGE TREATMENT OF FLUIDS

CROSS-REFERENCE TO RELATED APPLICATIONS

This application claims the benefit of U.S. Provisional Application No. 62/516,612, filed on Jun. 7, 2017, which is incorporated herein by reference in its entirety.

FIELD OF THE INVENTION

The invention relates to industrial electrically regenerable ion exchange. In particular, embodiments of the present invention relate to the treatment of fluids in an electrochemical cell, working capacity, power supply, and designs for cells and systems which particularly benefit deployment in large systems.

BACKGROUND

Fluid treatment apparatus comprising electrically regenerable ion exchange cells (ERIX cells) can be used to treat fluids to, for example, selectively exchange ions present in fluids, remove contaminants from drinking water, reduce total dissolved solids (TDS), treat industrial process intermediates, and treat sewage, amongst other uses. Electrically regenerable ion exchange cells include water-splitting ion exchange membranes, also known as bipolar membranes, between facing electrodes in a cell. When a current is applied to the electrodes by a cell power supply, water is irreversibly dissociated into $H^+$ and $OH^-$ ions at the boundary between the cation and anion exchange layers of the membranes, causing cations and anions to be exchanged from the fluid stream passing through the cell, for example in the deionization of a fluid during a production step. Electrochemical cells can be regenerated, during which time ions removed in the deionization step are rejected into a concentrate between the membranes, without using hazardous chemicals, simply by reversing the applied electric potential while flushing the cell with a fluid.

The working capacity of ERIX systems limits the range of applications for which it is practical. Ions removed from a fluid during treatment are transported from the bipolar membrane surface to its interior at a decreasing rate as the ion exchange capacity is exhausted, causing the rate of deionization of the fluid to decrease. Eventually the rate of deionization drops enough that regeneration is necessary. Often, regeneration is required before a substantial proportion of membrane ion exchange capacity has been consumed.

During deionization in particular, as the membrane ion exchange capacity operation is consumed, the electrical resistance of the cell decreases, drawing more current from the power supply. All power supplies have a limit to the voltage and current (power) which they can deliver, and the relatively low current limits provided by affordable, conventional power supplies, whether commercial or custom, are a serious limiting factor in the practice of electrically regenerable ion exchange systems.

Further, in deploying large electrically operated equipment employing power supplies that include transformers, a very cost effective design, the power that is handled is large enough to present serious reliability and safety hazards. If the equipment load resistance drops too low, the transformer will deliver more current than it can handle, and it will be damaged or self-destruct. For example, during deionization of a fluid with an ERIX cell, its electrical resistance, or impedance, will continuously drop, drawing more current from the transformer. If treating a fluid with high ionic concentration, the risk of the load resistance dropping too far, such that it draws too much current, increases, thereby running the risk of damaging or destroying the transformer. Programmable controllers can be employed to measure and limit this current, but any malfunction creates a serious reliability and a safety hazard.

Previously described ERIX cell designs depend on rubber o-ring seals and electrode integrated with the cell housing to provide the necessary fluid flow and electric fields for operation. While this has proven practical on small equipment, it is difficult to scale such designs to large equipment without serious problems with internal seal leaks and damage caused during assembly or service. ERIX equipment appropriate for industrial applications must be constructed from large, heavy membrane elements. If not installed precisely each and every time, these heavy membrane elements run the risk of distorting internal o-ring seals causing them to leak and allow contamination, for example, feed water contamination of product water. Further, these large membrane elements can damage electrode that is secured to the housing wall or on an interior support that is part of the housing, whenever the element is removed or installed in the housing during assembly or service.

Current ERIX system designs require multiple valves for each cell. Scaling the previously described ERIX designs to very large ERIX equipment employing, for example, hundreds of cells, would require the use of hundreds of valves and very complicated plumbing manifolds. The reliability problems alone associated with such designs would render very large ERIX equipment impractical for industrial or municipal applications.

It is desirable to have a fluid treatment method employing ERIX cells that can extend or increase cell working capacity for ion removal and subsequent regeneration. It is further desirable to provide a power supply that can deliver greater currents than are now available to improve system performance, including working capacity and regeneration rates. It is advantageous to have a power supply that is inherently unable to damage or self-destruct when its resistive load drops below a critical threshold, even if its current control circuitry fails. It is also desirable to provide ERIX cell designs that eliminate reliability failures when employed for the construction of large, heavy cells. And it is advantageous to have system designs for very large applications that do not depend on vast numbers of valves or complicated plumbing manifolds which by their very numbers and complexity assure reliability failures.

BRIEF SUMMARY OF THE INVENTION

In one aspect, low frequency, high voltage transformers are provided that comprise multiple voltage output steps which are utilized one at a time, comprising conductor diameters for each secondary output winding which are selected to provide similar electrical resistance. In one embodiment, the transformer is used to power an ERIX cell. In an embodiment, an ERIX cell is provided, wherein power for operation of the cell is provided by a transformer as described herein.

In an embodiment, the transformer comprises a plurality of voltage output steps that are utilized one at a time, wherein the transformer comprises primary and secondary coils wound around a magnetic core, wherein the secondary coils comprise secondary output winding with conductor diameters for each secondary output winding which are selected to provide similar electrical resistance.

In an embodiment, the largest diameter conductors are located nearest the magnetic core. In an embodiment, the input-output frequency is about 50 Hz to about 200 Hz. In an embodiment, the highest output voltage is at least about 600 V. In an embodiment, the output power of each voltage output step is at least about 1000 W. In an embodiment, the transformer comprises two secondary coils. In an embodiment, the transformer comprises two primary coils.

In some embodiments, the transformer comprises a magnetic dispersion bridge having a reluctance which decreases as the magnetic flux surpasses a prescribed flux density, the decrease being sufficient to prevent the output current from damaging the transformer or other system components regardless of load resistance. In an embodiment, the transformer comprises a magnetic dispersion bridge and a magnetic flux, wherein the magnetic dispersion bridge comprises a reluctance which decreases as the magnetic flux surpasses a prescribed flux density, the decrease being sufficient to prevent an output current from damaging the transformer and/or other system components, regardless of load resistance. For example, the magnetic dispersion bridge may comprise iron-silicate, e.g., stainless steel, e.g., iron-silicate stainless steel sheets.

In another aspect, methods are provided to reduce the ion concentration of an influent solution comprising: (a) an electrochemical cell comprising: (i) first and second electrodes; (ii) a water-splitting ion exchange membrane between the first and second electrodes, the membrane comprising: a cation exchange surface facing the first electrode, and an anion exchange surface facing the second electrode; (iii) an influent solution inlet and an effluent solution outlet with a solution channel there-between, the solution channel allowing the influent solution to flow past both the anion and cation exchange surfaces of the water-splitting ion exchange membrane and thereby form the effluent solution; and (iv) a power supply capable of maintaining the first and second electrodes at one or more DC voltage levels during an ion exchange stage; (b) a first step in which deionization power is maintained without interruption while flowing influent solution through the cell, (c) stopping solution flow and turning off the cell power, (d) flowing regeneration feed water to discharge ions in the cell, (e) turning on cell power with the opposite polarity to regenerate the cell, and (f) initiating regeneration feed fluid, e.g., water flow. In one embodiment, an additional step is inserted between steps (b) and (c) in which the deionization power is maintained while discharging the cell contents back to the influent feed source with regeneration feed fluid, e.g., water. In some embodiments, the method comprises use of a transformer as described above.

In an embodiment, the method comprises reduction of the ion concentration of an influent solution in an electrochemical cell that comprises: (i) first and second electrodes; (ii) a water-splitting ion exchange membrane between the first and second electrodes, the membrane comprising: a cation exchange surface facing the first electrode, and an anion exchange surface facing the second electrode; (iii) an influent solution inlet and an effluent outlet with a solution channel therebetween, the solution channel allowing the influent solution to flow past both the anion and cation exchange surfaces of the water-splitting ion exchange membrane and thereby form an effluent solution; and (iv) a power supply capable of maintaining the first and second electrodes at one or more DC voltage levels during an ion exchange stage; said method comprising: (a) maintaining deionization power without interruption while flowing influent solution through the cell; (b) stopping solution flow and turning off the cell power; (c) flowing regeneration feed fluid, e.g., water to discharge ions in the cell; (d) turning on cell power with the opposite polarity to regenerate the cell; and (e) initiating regeneration feed fluid, e.g., water flow.

In another aspect, methods are provided to reduce the ion concentration of an influent solution comprising: (a) an electrochemical cell comprising: (i) first and second electrodes; (ii) a water-splitting ion exchange membrane between the first and second electrodes, the membrane comprising: a cation exchange surface facing the first electrode, and an anion exchange surface facing the second electrode; (iii) an influent solution inlet and an effluent solution outlet with a solution channel there-between, the solution channel allowing the influent solution to flow past both the anion and cation exchange surfaces of the water-splitting ion exchange membrane and thereby form the effluent solution; and (iv) a power supply capable of maintaining the first and second electrodes at one or more DC voltage levels during an ion exchange stage; (b) a first continuous step in which deionization power is maintained without interruption while flowing influent solution through the cell, (c) stopping flow and turning off the cell power, (d) flowing regeneration feed fluid, e.g., water to discharge ions in the cell, and repeating steps (b)-(d). In some embodiments, the method comprises use of a transformer as described above.

In an embodiment, the method comprises reduction of the ion concentration of an influent solution in an electrochemical cell that comprises: (i) first and second electrodes; (ii) a water-splitting ion exchange membrane between the first and second electrodes, the membrane comprising: a cation exchange surface facing the first electrode, and an anion exchange surface facing the second electrode; (iii) an influent solution inlet and an effluent outlet with a solution channel therebetween, the solution channel allowing the influent solution to flow past both the anion and cation exchange surfaces of the water-splitting ion exchange membrane and thereby form an effluent solution; and (iv) a power supply capable of maintaining the first and second electrodes at one or more DC voltage levels during an ion exchange stage; said method comprising: (a) maintaining deionization power without interruption while flowing influent solution through the cell; (b) stopping solution flow and turning off the cell power; (c) flowing regeneration feed fluid, e.g., water to discharge ions in the cell; and (d) repeating steps (b)-(d).

In some embodiments, electrochemical cells are provided for reduction of the ion concentration of an influent solution comprising: (a) a housing comprising a cylindrical pipe, an end cap on one end, and a flange fitting on the other, and (b) a bipolar membrane assembly comprising: (i) an inner electrode support, at least one end of the electrode passing through the blind flange, the inner support having features which allow water to pass from the inner volume of the spiral wound bipolar membrane to the exterior of the cell via a hole in the blind flange; (ii) a spiral wound bipolar membrane sealed on one end, and on the other end sealed to the blind flange of the inner electrode support, and (iii) an outer electrode wrapped on the surface of the bipolar membrane assembly having at least one end passing through the blind flange. In some embodiments, the housing and the blind flange comprise or consist of polyvinyl chloride (PVC) or cholorpolyvinyl chloride (CPVC).

In an embodiment, the electrochemical cell comprises: (a) a housing comprising first and second ends, an end cap on the first end of the housing, and a flange fitting on the second end of the housing; and (b) a bipolar membrane assembly comprising: (i) an inner electrode wound around an inner electrode support, wherein at least one end of said inner electrode passes through a blind flange; (ii) a bipolar membrane wound around the electrode support and comprising an interior volume, wherein the bipolar membrane is sealed on one end and secured on the other end to the blind flange; and (iii) an outer electrode wound around the bipolar membrane, wherein at least one end of said outer electrode passes through the blind flange, wherein said inner electrode support comprises openings that allow liquid to pass from the interior volume of the spiral wound bipolar membrane to the exterior of the cell via a hole in the blind flange.

In another aspect, apparatus are provided for the treatment of an influent solution comprising an electrochemical cell as described above and a transformer as described above.

In another aspect, apparatus are provided for the continuous treatment of an influent solution comprising at least two stages, a stage comprising at least one cell comprising a bipolar membrane, in which during operation: (a) a first stage is deionizing influent solution; (b) a second stage is regenerating or in idle following regeneration; and (c) when the service time is reached in response to time, volume or other parameter, the deionization stage begins regeneration as the second stage begins deionization. In some embodiments, the apparatus comprises electrochemical cells as described above. In some embodiments, the apparatus comprises a transformer as described above. In some embodiments, the apparatus comprises six or fewer valves for each stage. In some embodiments, the apparatus provides at least about 5 liters/minute flow rate for each electrochemical cell in a stage. In some embodiments, the service time is about 5 to about 60 minutes.

In an embodiment, a system is provided for the continuous treatment of an influent solution comprising at least two stages, wherein each stage comprises at least one electrochemical cell comprising a bipolar membrane, wherein during operation: (a) a first stage comprises deionizing an influent solution; and (b) a second stage comprises regeneration or an idle mode following regeneration, wherein when a service time is reached in response to time, volume, or another parameter, the first stage begins regeneration as the second stage begins deionization. In an embodiment the at least one electrochemical cell for each stage comprises: (a) a housing comprising first and second ends, an end cap on the first end of the housing, and a flange fitting on the second end of the housing; and (b) a bipolar membrane assembly comprising: (i) an inner electrode wound around an inner electrode support, wherein at least one end of said inner electrode passes through a blind flange; (ii) a bipolar membrane wound around the electrode support and comprising an interior volume, wherein the bipolar membrane is sealed on one end and secured on the other end to the blind flange; and (iii) an outer electrode wound around the bipolar membrane, wherein at least one end of said outer electrode passes through the blind flange, wherein said inner electrode support comprises openings that allow liquid to pass from the interior volume of the spiral wound bipolar membrane to the exterior of the cell via a hole in the blind flange.

In another aspect, apparatus are provided for the continuous treatment of an influent solution comprising three stages, each stage comprising two cells comprising a bipolar membrane, in which during operation: (a) a first stage is deionizing influent solution and passes its product to a second stage; (b) a second stage is deionizing to provide product water; (c) a third stage is regenerating or in idle following regeneration; and (d) when the service time is reached in response to time, volume or other parameter: (i) the first stage begins regeneration; (ii) the second stage begins deionizing influent solution; and (iii) the third stage begins deionizing the product from the second stage. In some embodiments, the apparatus comprises electrochemical cells as described above. In some embodiments, the apparatus comprises a transformer as described above. In some embodiments, the apparatus comprises six or fewer valves for each stage. In some embodiments, the apparatus provides at least about 5 liters/minute flow rate for each electrochemical cell in a stage. In some embodiments, the service time is about 5 to about 60 minutes.

In an embodiment, a system is provided for the continuous treatment of an influent solution comprising at least three stages, wherein each stage comprises at least two electrochemical cells that comprise a bipolar membrane, wherein during operation: (a) a first stage comprises deionizing an influent solution, thereby producing a product solution which is passed to a second stage; (b) a second stage comprises deionization of the product solution, thereby producing product solution; and (c) a third stage comprises regeneration or an idle mode following regeneration, wherein when a service time is reached in response to time, volume, or another parameter: (i) the first stage begins regeneration; (ii) the second stage begins deionizing influent solution, thereby producing product solution: and (iii) and the third stage begins deionizing the product solution from the second stage. In an embodiment the at least two electrochemical cells for each stage comprise: (a) a housing comprising first and second ends, an end cap on the first end of the housing, and a flange fitting on the second end of the housing; and (b) a bipolar membrane assembly comprising: (i) an inner electrode wound around an inner electrode support, wherein at least one end of said inner electrode passes through a blind flange; (ii) a bipolar membrane wound around the electrode support and comprising an interior volume, wherein the bipolar membrane is sealed on one end and secured on the other end to the blind flange; and (iii) an outer electrode wound around the bipolar membrane, wherein at least one end of said outer electrode passes through the blind flange, wherein said inner electrode support comprises openings that allow liquid to pass from the interior volume of the spiral wound bipolar membrane to the exterior of the cell via a hole in the blind flange.

BRIEF DESCRIPTION OF THE DRAWINGS

The features, aspects and advantages of the systems, apparatus and methods described herein will become better understood with regard to the following description, drawings, and appended claims, all of which provide illustrative examples of the systems, apparatus and methods. However, it is to be understood that each of the features described herein can be used by itself or in any selective combination, not merely in the context of any particular drawings or any particularly described combination of features, where:

FIG. 1A is a schematic view of an embodiment of a prior art housing having integral electrodes positioned in the housing such that when the membrane cartridge is installed, the electrodes are positioned inside and outside the spiral wrapped membrane.

FIG. 1B is a schematic of an embodiment of a prior art membrane cartridge.

FIG. 13 schematically depicts the plumbing of an embodiment of an ERIX Module that includes three pairs of cells (a total of six cells as described herein), with two cell pairs operating in series for the deionization step, and one cell pair in regeneration.

DETAILED DESCRIPTION

Figure 2:
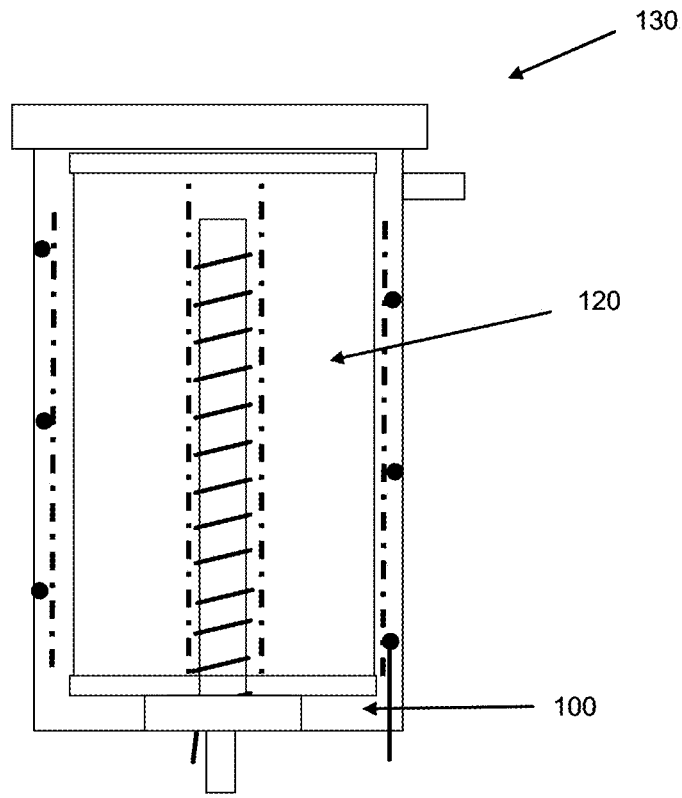
FIG. 2 is a schematic of an embodiment of a prior art ERIX cell in which the membrane cartridge depicted in FIG. 1B is installed in the housing depicted in FIG. 1A.

Embodiments of the present inventions may be used for treating a fluid to extract, replace or add ions to the fluid. Exemplary embodiments of the fluid treatment apparatus and methods are provided herein to illustrate the inventions, but these are not intended to limit their scope. For example, in addition to the treatment of water, which is described as an exemplary embodiment herein, the fluid treatment apparatus can be used to treat other fluids, such as those including solvents or oils, including suspended solids, and waste water.

A representative embodiment of a previously described electrically regenerable ion exchange (ERIX) housing is shown in FIG. 1A. The housing 100 includes a vessel 101 having cylindrical walls, a floor or bottom, and threads 112 or other features to secure a lid 102 at the top of the vessel. The outer electrode 103 is held against the inner vessel wall by a cylindrical plastic net 104, or other mechanical means which avoids substantial insulation of the electrode surface. Blocking or insulating parts of the electrode surface will reduce its life and may interfere with the uniform distribution of the electric field in use. The outer electrode is preferably attached to the netting with features molded into the net before the two parts are slid into the vessel. The outer electrode end is passed through a hole 108 in the bottom of the vessel, and the hole sealed, for example, with a rubber gasket and compression nut which screws into the vessel from the outside bottom. The inner electrode 105 is wrapped around a riser tube 106 before installation in the vessel, and the riser tube with electrode is compression fit into a feature in the vessel floor to secure it as part of the housing. The end of the inner electrode passes through a hole 107 which is sealed as for the outer electrode with a rubber gasket. A "land" feature 109 on the inside floor of the vessel is included to seal to the membrane cartridge o-ring when this replaceable component is installed in the housing. The housing has one inlet 110 and one outlet 111 during regeneration, which are typically switched during deionization such that 111 is the inlet and 110 is the outlet.

In FIG. 1B is shown an embodiment of a previously described membrane cartridge 120. Membrane cartridge 120 is prepared for example from, e.g., 25 sheets of bipolar membrane 122, each, e.g., 40 cm long, which are wound in parallel on a core net tube 124 to form a membrane "log." Prior to capping, this log is trimmed to form, e.g., square ends, and in this embodiment a cut length of, e.g., 15.6 cm. A top cap 126 and bottom cap 127 are attached with adhesive, e.g., polyamide adhesive, with the bottom cap 127 having a nose feature onto which an o-ring 128 is installed. Bottom cap 127 also has a hole in the center large enough to slide over the riser tube 106 with electrode 105 which is integral to the housing 100. In another previously described embodiment, not illustrated here, but described herein for completeness, the housing lid 102 serves as both the membrane cartridge top cap 126 and the housing lid.

Membrane cartridge 120 fits into housing 100 to provide an ERIX cell 130 as shown in FIG. 2. The housing's inner electrode/riser tube enters the core net tube 124 when the cartridge is installed. The o-ring 128 seals to the inner wall of the land 109 in the housing to prevent fluid inside and outside the membrane cartridge from mixing. Water flows parallel to the bipolar membrane 122 surfaces (e.g., 40 wound in parallel) in this example when passing through the housing. When the membrane cartridge is removed or replaced, the electrodes remain integral to the housing for use with a re-installed membrane cartridge 120.

Figure 3:
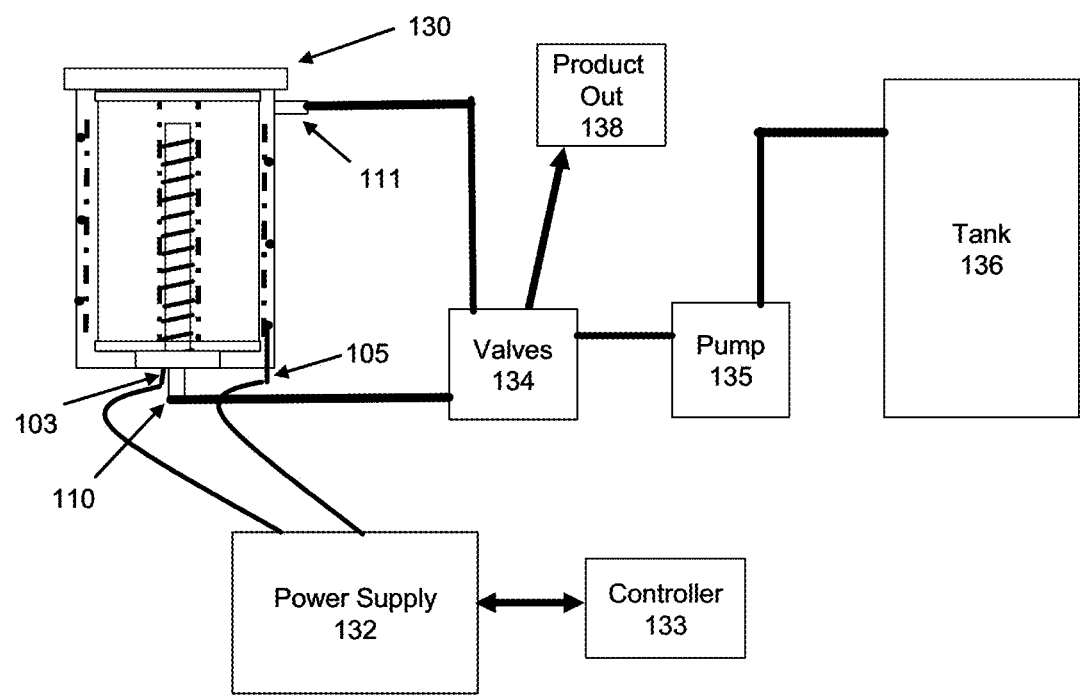
FIG. 3 is a schematic of an embodiment of an ERIX system, in which the key components are identified.

An ERIX system is illustrated in FIG. 3. It includes the ERIX cell 130, a direct current (DC) power supply 132 to power the electrodes 103 and 105 by supplying a current and voltage to the electrodes. Controller 133 manages the power output and electrode polarity to cell 130, and monitors and reports sensor or other readings to the operator. A valve system 134, which controls the fluid supply provided by pump 135 from a fluid source tank 136, provides an influent fluid stream to the cell at deionization inlet 111. The treated fluid is passed out of cell 130 at outlet 110, which is then released at product outlet 138. Nonlimiting examples of electrochemical ion exchange apparatus are described, for example, in U.S. Pat. Nos. 5,788,812, 7,344,629, 7,780,833, 7,959,780, 8,562,803, all of which are incorporated herein by reference in their entireties.

The electrodes 103,105 of ERIX cell 130 are fabricated from electrically conductive materials, such as a metal or metal alloy, which are resistant to corrosion in the low or high pH chemical environments formed during the positive and negative polarization of the electrodes 103,105, in operation of the cell 130. Suitable electrodes can be fabricated from corrosion-resistant materials such as, but not limited to, titanium or niobium, and can have an outer coating of a noble metal, such as, but not limited to, ruthenium or platinum. The shape of the electrodes depends upon the design of the electrochemical cell 130 and the conductivity of the fluid stream flowing through the cell 130. Suitable shapes for the electrodes include, for example, wires, wire mesh wraps and sheets with punched holes. The electrodes are arranged to provide substantially uniform electric potential drop across the layers of bipolar membrane in membrane cartridge 120 normal to the membrane surfaces upon application of a current to the electrodes 103, 105.

The cation exchange and anion exchange layers of the bipolar membrane include cation and anion exchange materials, respectively, typically in the form of solids or gels containing ions that are replaceable by other ions or which chemically react with specific ions to remove the ions from the fluid stream. For example, suitable cation and anion exchange materials can include crosslinked or un-crosslinked organic polymers or inorganic structures such as, e.g., zeolites.

Cation exchange materials exchange cations with no permanent change to the structure of the material, and can include, for example, acidic groups. Suitable cation exchange materials can include one or more acidic functional group capable of exchanging cations such as, e.g., $-COOM$, $-SO_3M$, $-PO_3M_2$, and $-C_6H_4OM$, where M is a cation (e.g., hydrogen, sodium, calcium, or copper ion). Cation exchange materials also include materials that include neutral groups or ligands that bind cations through coordinate rather than electrostatic or ionic bonds (for example, pyridine, phosphine and sulfide groups), and groups that include complexing or chelating groups (e.g., those derived from aminophosphoric acid, aminocarboxylic acid and hydroxamic acid).

Anion exchange materials exchange anions with no permanent change to the structure of the material. Suitable anion exchange materials may include one or more basic functional groups capable of exchanging anions such as, e.g., $-NR_3A$, $-NR_2HA$, $-PR_3A$, $-SR_2A$, or $C_5H_5NHA$ (pyridine), where R is an alkyl, aryl or other organic group and A is an anion (e.g., hydroxide, bicarbonate, chloride, or sulfate ion).

The selection of suitable cation and anion exchange materials for the bipolar membrane depends on the desired application(s) of use. For example, in an embodiment, in the deionization of a water based solution stream, a membrane including a cation exchange layer having $-SO_3M$ or carboxylic acid ($-COOH$) groups, and an anion exchange layer having $-NR_3A$ groups such as trimethyl ($-NCH_3$) or triethyl ammonium ($-N(C_2H_5)_3$ groups), are used. Such membranes readily swell in water, thereby providing lower electrical resistances and higher mass transport rates over a wide range of pH. Anion exchange materials including weak base or weak acid groups may be used when particularly efficient ion exchange regeneration is required. For example, $-NR_2HA$ will react with $OH^-$ in a very favorable reaction to form $-NR_2$, $H_2O$, and expel $A^-$. As another example, for the selective removal of calcium or copper ions from a liquid containing other ions, for example, sodium ion, ion exchange groups such as $-COOM$ or a chelating group, such as aminocarboxylic acid, may be used. These weak acid groups offer the additional benefit of particularly efficient regeneration due to the strongly favorable reaction of $-(COO)_nM$ with $H^+$ to form $-COOH$ and expel $M^{+n}$, where M is a metal ion.

In some embodiments, water splitting ion exchange membranes can be textured with a pattern of repeating three-dimensional shapes, such as arrays of peaks and valleys, exemplary but nonlimiting embodiments of which are described in U.S. Pat. Nos. 7,780,833 and 7,959,780, which are incorporated herein by reference in their entireties. The textured features can be an array of furrows and ridges that are linearly spaced apart and parallel to a flow path of the fluid stream passing through the cell. In some embodiments, the textured features have dimensions of about 50 to about 500 microns. The textured bipolar membranes can be wound either with a spacer which is deposited directly on one or both membrane surfaces, or without a spacer.

Figure 4:
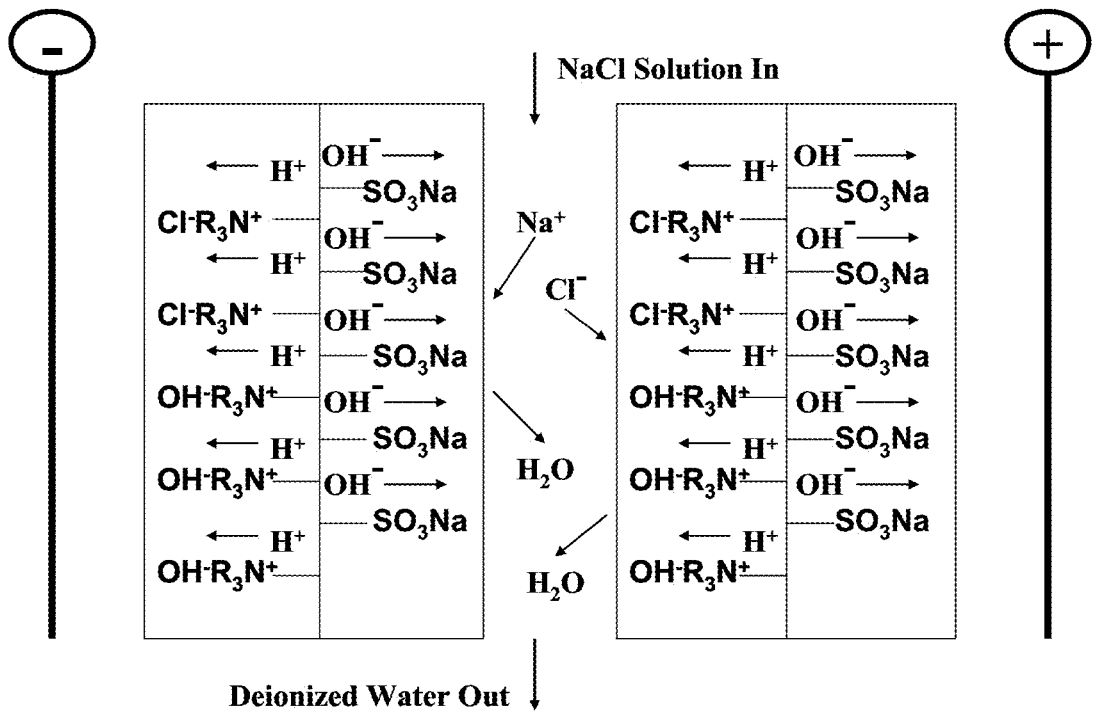
FIG. 4 is a schematic of an ERIX deionization process step.

The electrically regenerated ion exchange process cycles between deionization and regeneration step(s). As an example, the deionization step for removing sodium chloride from solution is shown in FIG. 4. This is the classic ion exchange process in which the cation and anion exchange materials are in the acid and base forms, respectively, at the outset of deionization. In the ERIX process, however, a voltage is typically applied during the deionization step to accelerate ion extraction (ions move faster in the electric field). The ion extraction steps accompanying FIG. 4 for two types of cation exchange resins—strong acid (P—SO_3H) and weak acid (P—COOH)—are shown in Reactions 1 and 2, and for two types of anion exchange resin—strong base (P—NR_3OH) and weak base (P—NR_2)— in Reactions 3 and 4. "P—" represents the insoluble ion exchange matrix.

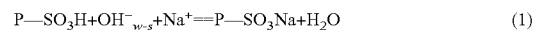   (1)

   (2)

   (3)

   (4)

Ions $OH^-_{w-s}$ and $H^+_{w-s}$ are produced at the boundary between the anion and cation layers of the water-splitting membrane, hence its name. These ions migrate through the cation and anion layers, respectively, in the direction of the electrode having the opposite polarity. In the process, they react with acid and base on the ion exchange resins, thereby accelerating the extraction of $Na^+$ and $Cl^-$ from solution. Because the ion exchange resins are in the acid and base forms, NaCl is removed from solution and replaced by $H_2O$, thereby effectively deionizing the fluid. In addition, due to the acid and base forms of the ion exchange resins prior to the deionization step, weak bases such as ammonia ($NH_3$) are extracted by the cation layer, and weak acids such acetic acid ($CH_3COOH$) or chloroacetic acid ($ClCH_2COOH$) are extracted by the anion layer.

Figure 5:
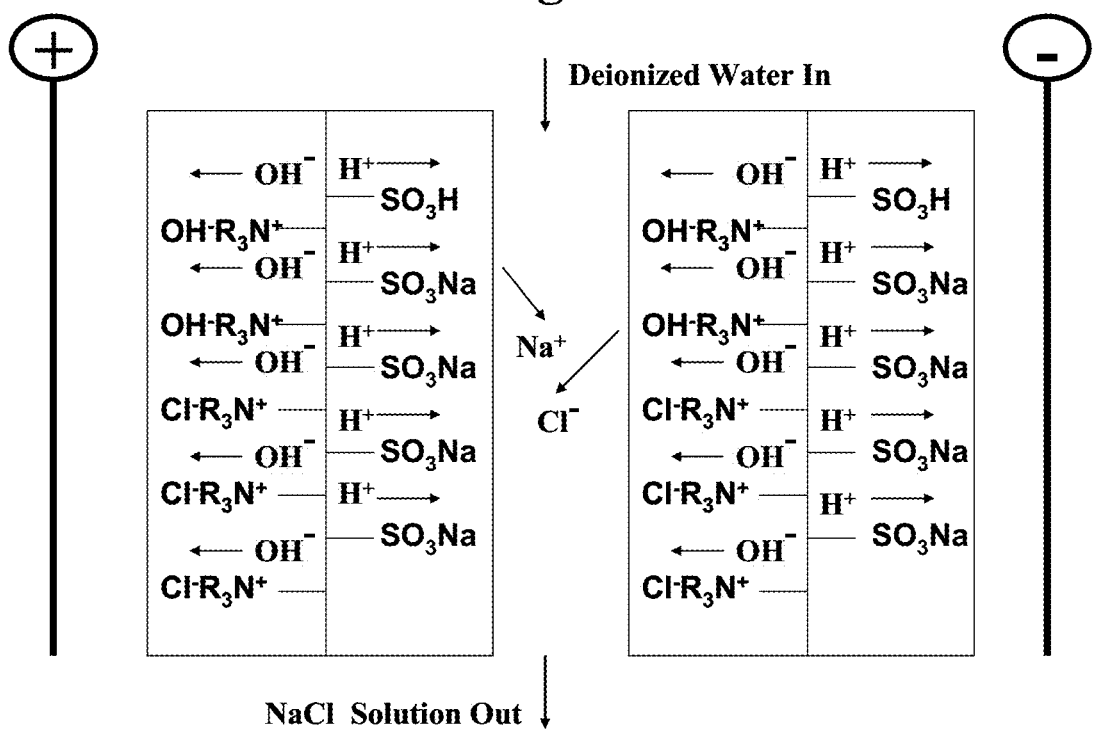
FIG. 5 is a schematic of an ERIX regeneration process step.

When the ERIX device's capacity for ions is exhausted, a regeneration step is required (FIG. 5). Regeneration is initiated by reversing the voltage polarity, and typically also the flow direction. At the boundary between the cation and anion exchange layers, water splits into its component ions acid ($H^+_{w-s}$) and hydroxide ($OH^-_{w-s}$), which migrate through the ion exchange layers, toward the electrode having opposite polarity. Hydrogen ion ($H^+$) replaces sodium in the cation exchange layer, and hydroxide ion ($OH^-$) replaces chloride in the anion exchange layer. The ion expulsion reactions for two types of cation resin are shown in Reactions 5 and 6, and for two anion resins in Reactions 7 and 8.

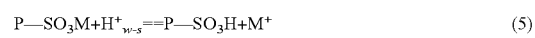   (5)

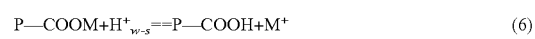   (6)

   (7)

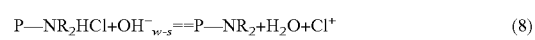   (8)

In FIG. 5, sodium chloride "waste" is concentrated in the solution exiting the device, and the water-splitting membranes are returned to the condition necessary for another deionization cycle.

Figure 6:
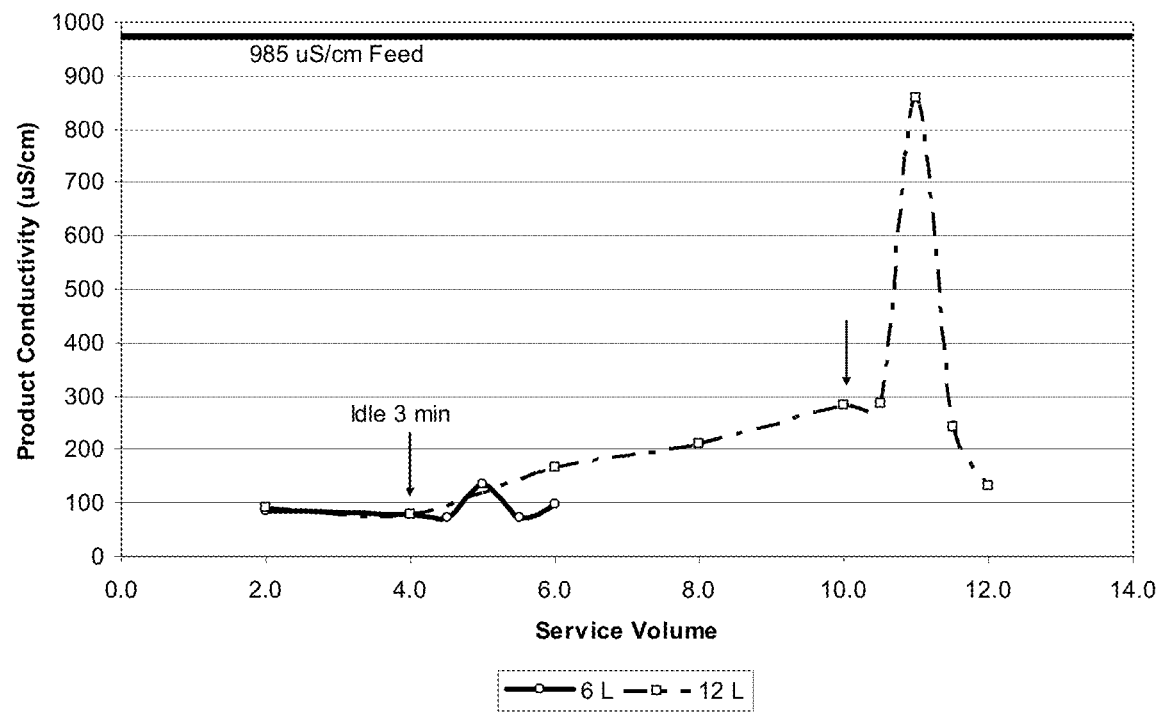
FIG. 6 shows experimental results illustrating the extent of capacitive ion binding, which limits the deionization service volume to 6 L for a drinking water system.

Regeneration is required when the effective ion exchange capacity is exceeded. Previously described ERIX systems are programmed to regenerate when the devices are in a state in which they will release ions into the water between membrane layers when sitting idle (e.g., when used in intermittent applications such as point-of-use (POU) drinking water). This phenomenon is referred to as a "conductivity spike". Conductivity spike ions are not chemically exchanged, but rather are concentrated near or within the bipolar membrane until the voltage is removed. For example, in FIG. 6 is shown the result of operating an ERIX POU system at two service volumes, 6 liters and 12 liters. For both plots in FIG. 6, continuous feed water having a conductivity of 985 $\mu$ S/cm was fed into a small ERIX POU system (a LINX 140 drinking water system manufactured by Pionetics Corporation) at 1.9 liters/minute until the treated volume reached 2.0 liters less than the programmed service volume. Then, the flow was stopped for 3 minutes. Deionization flow then resumed for the final 2.0 liters, after which regeneration commenced. Product water conductivity was recorded and plotted in FIG. 6 at 2 liter intervals prior to the 3 minute idle period, and at 0.5 liter intervals thereafter. When the volume deionized prior to the idle increases from 4 to 10 liters, the spike in conductivity observed after restarting flow increases dramatically. This high conductivity solution, which exits the system after the idle period, is produced by ions that are not chemically exchanged on the ion exchange membrane, because the ion exchange sites at and near the membrane surface at this point in the deionization process are occupied by ions earlier extracted. Thus, the intermittently operated ERIX systems as previously described in the literature, are programmed to regenerate before a substantial conductivity spike will occur, leaving a substantial percentage of the bipolar membrane ion exchange capacity unused, and thereby reducing productivity by using proportionately more water for regeneration, which is discarded to waste.

Supplemental Capacitive Deionization

Capacitive deionization is a process distinct from the electrically regenerated ion exchange that also removes ions from a fluid. Capacitive deionization employs electronically conductive electrodes that are charged by a power supply; one electrode receives an excess of electrons, and the other receives a deficiency of electrons with the application of a voltage. This process is practiced at voltages that are below the threshold required to cause electrochemical reactions at the electrode surfaces, in order to avoid the corrosion of the electrodes. In contrast, the ERIX process requires high electrode voltages to create a sufficient electric field across each bipolar membrane layer in a cell (for example 50 layers of membrane between two electrodes requires a voltage across the electrodes of 300 V). When the voltage is applied in a capacitive deionization device, cations (e.g., $Na^+$) migrate toward the negative electrode, and anions (e.g., $Cl^-$) migrate toward the positive electrode to form "double layers" at both electrode surfaces. The double layer refers to the stacking of positive and negative ion layers near the two electrode surfaces to effectively reduce their bulk fluid concentrations. These capacitively held ions are released into the fluid between the electrodes when the voltage across the electrodes, typically ~2 V during the deionization step, is shorted (approaches zero). Since the ions are not chemically bound to the electrode, they immediately diffuse into the bulk solution and are pumped out of the device, thereby providing the regeneration step. For a detailed description of the capacitive deionization process and apparatus, see, e.g., U.S. Pat. No. 5,779,891, which is incorporated by reference herein in its entirety, and the references cited therein.

It has now been discovered that the onset of the conductivity spike, which was described above for ERIX cells and until now defined the upper limit for the service volume of an ERIX system under a given set of conditions, presents an opportunity to improve the performance of an ERIX system. Because ERIX devices do not include high surface area electrodes as capacitors for ion removal, but rather depend upon ionically conductive bipolar ion exchange membranes, it was previously unexpected that the conductivity spike could be the result of a capacitive removal mechanism, and in the literature, there is no discussion of a capacitive mechanism playing a role in the operation of ERIX systems.

It has now been discovered, unexpectedly, that ERIX cells and systems behave as capacitive deionizers during the latter portion of their deionization service when, advantageously, the ion exchange contribution to ion removal is substantially reduced. In developing the design rules described herein for large ERIX equipment and methods of operation, however, it was discovered that this conductivity spike which occurs very soon after the cell voltage is shorted to near zero is the behavior of a capacitive deionizer in its regeneration mode. The key to exploiting this phenomenon in an ERIX system is to continuously apply the electric field while producing water. Once the field is removed, these apparently capacitively held ions are released. In Example 1 are shown the results of four experiments in which a small ERIX system treats increasing volumes of an incoming aqueous solution to quantify the degree of capacitive deionization obtained as a function of deionization time or volume.

Transformers

In the schematic of an ERIX system depicted in FIG. 3, power supply 132 converts an AC voltage source into a DC voltage output to charge the cell electrodes 103,105 and drive fluid treatment in cell 130. Soon after a freshly regenerated ERIX cell is placed into deionization service, cell electrical resistance is high, cell voltage is correspondingly high (for example at maximum), and cell current is low but slowly rising. Cell resistance is initially high because the membrane includes few ions absorbed from the incoming fluid or from the water splitting reaction at the boundary between the anion and cation exchange layers. As the membrane cartridge chemically exchanges more ions and the water-splitting reaction continues, the membrane's electrical resistance decreases. At the same time, the membrane's surface ion exchange sites become more occupied by ions absorbed from the incoming fluid, which causes the rate at which ions are removed from the incoming fluid to decrease. This causes the resistivity of the fluid between the membrane layers to decrease. The combination of decreasing membrane and fluid resistivity causes the power supply 132 to eventually reach its current limit. Thereafter, the power supply controller 133 reduces the output voltage to prevent a further rise in current and avoid damage to any system components. Unfortunately, the lower the current limit, the sooner the deionization step must be concluded and regeneration must begin by switching the polarity of the voltage applied to the electrodes. This early exit from deionization causes lower productivity and greater water waste.

The power supply 132 typically includes three elements to drive one or more ERIX cell(s): a rectifier to convert AC to DC current; means to control or limit current; and if multiple voltage outputs are required, means to vary or switch voltage to the cells. It is also generally beneficial to include means to multiply the DC voltage output(s). To provide substantial utilization of the ERIX cell's ion exchange capacity and the newly discovered capacitive deionization contribution, it is advantageous to design power supplies capable of higher current limits than are currently available from transformers. In some embodiments, a power supply design, particularly for cells requiring high voltage (>200 V) and power (>1000 W) employs a low frequency, high voltage isolation transformer to convert the input AC power to one or more higher voltage AC outputs. Conversion of the AC power to DC power and power supply control are provided by separate electrical and electronic circuits subsequent to the transformer. Low frequency refers to frequencies in the range about 50 to about 200 Hz, for example, about 50 to about 60 Hz. Certain embodiments include voltage steps that permit the controller to instruct the power supply to deliver more or less voltage to the ERIX cell(s) depending on the situation. For example, when a freshly regenerated cell is placed in deionization service, it has a high electrical resistance and thus requires high voltage and draws relatively little current. As this cell treats more incoming fluid, its electrical resistance drops as described above, it draws more current, and eventually reaches the transformer's current limit. Currently available transformers deliver, or are "rated," for a maximum constant current regardless of voltage steps, for example 5 A. Thus if a currently available transformer is rated for 5 A and has six voltage steps, e.g., 600, 500, 400, 300, 200 and 100 V, then the power output of these six steps decreases in the order 3000, 2500, 2000, 1500, 1000 and 500 W, respectively (power=volts*current). This decreasing power available to the ERIX cell at lower voltages decreases the deionization effectiveness of the cell proportionately, causing an early end to the deionization step, which reduces productivity and causes greater water waste.

Provided herein is a design for a low frequency transformer having multiple voltage outputs, each voltage output being used singularly (one at a time), to provide similar power at each output. This provides substantially greater currents at the lower voltage steps, permitting the significant extension of ERIX cell deionization time or service volume in comparison to what can be done with previously described transformers. For example, if the power supply has a maximum output of 3000 W, a transformer as described herein, including six independent windings (voltage steps) will provide an ERIX cell with up to 3000 W at each of six voltage steps: 600V/5A, 500V/6A, 400V/7.5A, 300V/10A, 200V/15A or 150V/20A. The previously described transformers would provide 5 A at all six voltage outputs, only 25% of the current which can be supplied by this embodiment of the presently disclosed transformer. The four-fold greater current output at 150 V in this example permits the extension of the deionization step by several fold service volume. The regeneration requires a fixed time and water volume (which exits the ERIX system as waste), for example, 20 minutes and 50 liters. If the deionization service volume is doubled from, for example, 200 to 400 liters, the recovery, the percentage of water entering the system which exits as product or treated water, increases from 200/250=80% to 400/450=89%, a very substantial decrease in water waste for a water treatment process.

This similar power output at each voltage step is obtained with a design that includes larger diameter wire (e.g., copper rather than aluminum, due to the former's lower electrical resistivity) for the lower voltage/higher current outputs. Greater currents are obtained from the lower ohmic losses in the larger diameter (e.g., copper) wire. Each output voltage step requires a certain number of conductor turns around the magnetic core. To calculate the ideal conductor diameter for each winding, equation 12, derived from equations 9-11, may be used:

$$R = \rho * L / A \quad (9)$$

$$V = I * \rho * L / A \quad (10)$$

$$V = I * \rho * L / ((D/2)^2 * \pi) \quad (11)$$

$$D = 2 * \{I * \rho * L) / V * \pi\}^{0.5} \quad (12)$$

in which R is electrical resistance (ohms), V is volts, I is current (A), $\rho$ (rho) is conductor material resistivity (ohm-cm), L is conductor (winding) length (cm), A is conductor cross-sectional area (cm$^2$), and D is the conductor diameter (cm).

In practice, one may not be able to procure the precise diameters calculated from equation 12, and so the nearest diameter must suffice. For this reason, the maximum power output of each voltage step may vary somewhat.

The largest diameter wire is wrapped adjacent the magnetic core to minimize vibration noise, provide the highest permeability to the outer wire windings, reduce the ohmic heat generated adjacent to the core, and minimize the wire length to provide the necessary turns of this most expensive, large diameter conductor. The smallest diameter wire is wound on the outside of the windings to provide the best heat dissipation in this most resistive conductor.

As an illustration, a 3000 W constant power output transformer as disclosed herein works with a single ERIX cell during a water deionization step as follows: At the start of deionization, the cell operates at the highest voltage step (e.g., 600 V) and draws a modest current, e.g., 3 A, such that the output is 600 V×3 A=1800 W power. As the current approaches the transformer's power limit for this voltage (e.g., 5 A and 3000 W), the controller instructs the use of a lower transformer voltage step, e.g., 500 V. When the current approaches this step's limit (6 A and 3000 W), once again the controller instructs the use of a still lower step voltage. This allows the cell to draw more and more current as lower voltage steps are employed because similar power is available from each winding as a result of the ERIX cell only using one transformer step at a time. The maintenance of power at each voltage step, as the deionization cell treats more incoming fluid, substantially extends the service (deionization) time for this cell, increasing production rates and reducing water waste.

Currently available power supplies employ current sensors and programmable controllers to limit the current to safe levels. When the current limit is approached, the controller instructs the power supply to apply a lower voltage to the cell, thereby reducing the current proportionately. This power supply current control can be reliably obtained with programmable control circuits and small power supplies, for example the power supplies limited to 100 W or 300 W, which are described in the ERIX apparatus literature. As the supply power output increases substantially, however, for example to 3000 W or more desired for the operation of large ERIX cells as disclosed herein, control circuits and relays become susceptible to damage and failure. Power control is not only more difficult, but failure to control current is proportionately more dangerous, representing a threat to the equipment and people.

Provided herein are materials and designs to create a magnetic dispersion bridge in a low frequency, high voltage transformer having one or more voltage steps. When used in ERIX systems, these transformers avoid excessive power or current output at each step without a programmable controller. In fact, even when the output as disclosed herein is short circuited, the transformer continues to limit current to a safe level for more than an hour without any sign of transformer overheating. In an embodiment, the programmable controller is still employed to switch voltage steps to maintain power at an optimum level, but plays no role in protecting the disclosed transformer from over-heating.

Magnetic devices, such as transformers, are generally described by Hopkinson's Law (Equation 13) which is analogous to Ohm's law with resistance replaced by reluctance (Rh), current by magnetic flux ($\phi$), and voltage by magnetomotive force (MMF). While Ohm's Law describes electrical energy loss, Hopkinson's Law describes magnetic energy storage. Similarly to how the electrical current will distribute according to the resistances of a circuit, the magnetic flux will proportionately pass through materials having lower reluctance (Equation 14).

$$MMF=\phi*Rh \text{ (analogous to Ohm's Law: } V=I*R) \qquad (13)$$

$$\phi=N*I/Rh \text{ (}MMF=\text{turns*current, or } N*I) \qquad (14)$$

$$Rh=L/(\mu*A) \qquad (15)$$

Under certain conditions, magnetic material reluctances are substantially constant, like electrical resistances, so that when the flux doubles, the MMF follows according to Equations 13 and 14, and the output current provided at the secondary coils in the transformer doubles. In ferromagnetic materials the permeability, and hence reluctance, depends on the flux. Ferromagnetic materials include magnetic domains which, in the absence of a magnetic field, are oriented randomly. When an external magnetic field is applied, the domains begin to orient in the external field's direction, causing an effective increase in permeability, and a decrease in reluctance according to Equation 15. As the external field increases and more and more ferromagnetic material domains become aligned, there are fewer domains to influence and the material approaches "saturation." At saturation, permeability peaks, and above the saturation flux, the permeability begins decrease until it reaches a value of 1.

Figure 8:
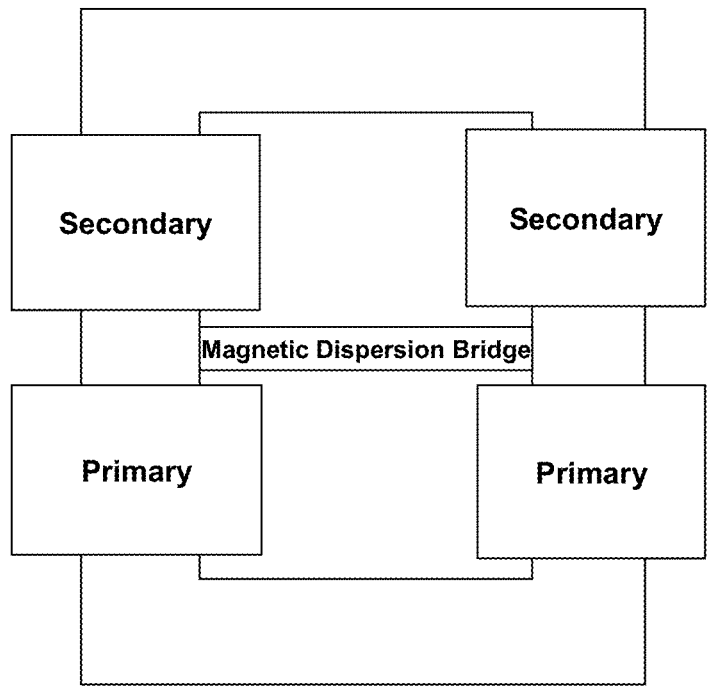
FIG. 8 is a schematic of a transformer that includes a reluctance bridge, which limits the current available at the secondary coils that power a load to protect the transformer from self-destruction.
Figure 9:
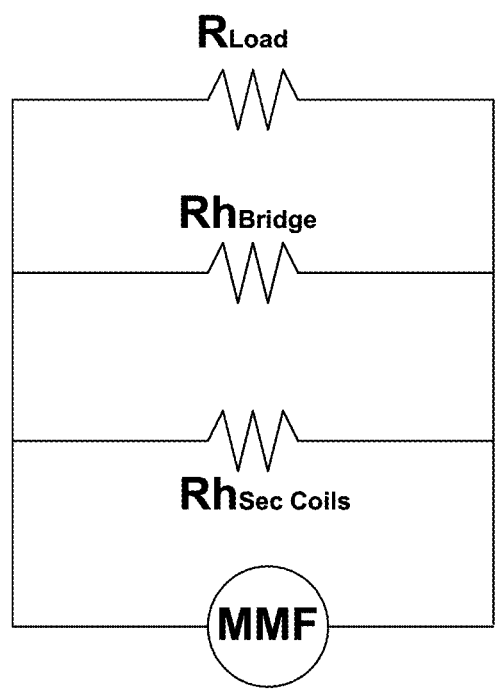
FIG. 9 is an equivalent circuit diagram of the magnetic circuit governing the behavior of the transformer depicted in FIG. 8. "Rh" are magnetic reluctances and "R" is electrical resistance.

By selecting a material that exhibits the onset of saturation at the appropriate flux, and choosing the appropriate geometry, we have discovered that a magnetic dispersion bridge useful for creating a high voltage, low frequency transformer which is resistant to overheating from excessive currents is obtained. This transformer is suitable for use with the large ERIX cells as disclosed herein, which exhibit large swings in load resistance or impedance during cyclic operation. However, the use of this self-protecting transformer invention is not limited to this application. The magnetic dispersion bridge is physically located as shown in FIG. 8. In FIG. 9 is shown an equivalent magnetic circuit for the transformer in FIG. 8, in which the bridge reluctance $Rh_{bridge}$ is in parallel with the secondary core reluctance(s) $Rh_{sec\ coil}$. When the magnetic flux increases in the range which causes the onset of saturation of the magnetic bridge, the bridge reluctance decreases and more flux passes through the bridge, while less flux passes through the magnetic core at the secondary coils. As described in Equation 14, where N is the number of secondary coil turns for a given voltage step (a constant for a given transformer design), I is current delivered by the secondary coils to the load, and Rh is the secondary coil(s) reluctance (a constant in this transformer design), the decrease in flux at the secondary coils causes a proportional decrease in current delivered to the load at the secondary coils. A suitably designed magnetic dispersion bridge will exhibit a decrease in reluctance as a function of magnetic flux which is sufficient to prevent damage to the transformer or other system components of the present invention while still permitting the delivery of the desired power via the secondary coils for the intended application. Balancing these two requirements requires substantial experimental trial and error.

The use of magnetic dispersion bridges in low voltage transformers, less than 24 VDC, is known. For example, Black and Decker manufactures a 12 VDC battery charger that includes a magnetic dispersion bridge for over-current protection under the product name BDV090. Above 24 VDC, however, the use of magnetic dispersion bridges to prevent catastrophic failure of transformers at low loads is not practiced and methods or materials to do so are not described in the literature. The absence of a description or working examples in the literature regarding magnetic dispersion bridges in high voltage transformers suggests a high complexity of their design, as well as extensive experience one needs to successfully safely, design, refine and confirm their behavior in high voltage transformers. This is further complicated by the need to create a magnetic dispersion bridge that provides a transformer which on the one hand delivers the required power to the intended load, but also does not allow excessive currents that will damage the transformer, defeating the purpose of the bridge. It is further speculated that the practice of magnetic dispersion bridges in previously described high voltage transformers is unknown because conventional transformer designs do not lend themselves to a flexible experimental method to custom design transformers with magnetic dispersion bridges, or these designs lead to highly variable outcomes. Provided herein are a design and a method for creating high voltage, low frequency transformers, including a magnetic dispersion bridge, which facilitates the optimization of the bridge to balance the need for self-protection from high currents, including short circuits, and delivery of the required current for the application.

Suitable materials for the transformer core and the magnetic dispersion bridge of the present invention include ferromagnetic materials, for example, grain-oriented electrical steel, also known as iron silicate stainless steel, which typically has a silicon concentration of about 3% (Si:11Fe). The magnetic flux in these materials is increased by 30% in the metal rolling direction (the grain direction; the grains being evident as a result of the rolling process), and this is the preferred orientation. Suitable electrical steel for the disclosed transformers is available under the general industrial description "Iron UI 80 w 1.5/kg", for example, available from Siemens Corporation or from COFER METAL S.p.a., and has a thickness of about 0.8 mm. The copper conductor material for windings may be of the Class H type, which has the fewest impurities to provide the highest conductivity and therefore the lowest temperature increase from ohmic losses. The coating on the winding conductor may be, for example, polyimide.

The general method to design a suitable magnetic dispersion bridge as disclosed herein involves a first step of estimating the behavior of materials for the present invention purpose, followed by trial and error testing of various bridges in transformers until the desired behavior is obtained. The identification of suitable candidate materials and their approximate dimensions for the bridge begins by recognizing that reluctance is related to permeability and the dimensions of the magnetic dispersion bridge according to Equation 15. Standard reference sources related to electrical materials provide the permeability as a function of flux density (Webers). From Hopkinson's Law and knowing turns, current, cross-sectional area and bridge length one can then calculate the change in bridge flux versus permeability. A short list of bridge materials and dimensions (cross-section area and length, the latter dimension in the flux direction) are selected which will increase reluctance enough to prevent a short circuit from damaging the transformer. This is only an approximate method using ideal or representative data from reference sources. To select the final material and magnetic dispersion bridge dimensions, one needs a suitable design which facilitates the testing of a variety of materials and dimensions. One procures the several materials in the required form (dimensions), and by trial and error, constructs a variety of bridges in the transformer of interest, for each bridge measuring the effectiveness to prevent transformer damage at very low loads, for example at zero (0) ohm loads, and to deliver the required currents for the application.

An example of the present transformer design, which facilitates the optimization of a practical, useful magnetic dispersion bridge in a high voltage, low frequency transformer, is described in Example 2.

Large ERIX Cell

Previously described ERIX cell designs, for example, for point of use (POU) drinking water systems in residential applications, are effective for the small systems in which they have been commercialized. As described above and illustrated in FIGS. 1A, 1B and 2, these cells include a housing having integral electrodes, a separate membrane cartridge including bipolar membranes wrapped around a core net tube which is removable and replaceable, and a housing lid. In one embodiment, the lid is integral to the membrane cartridge. In another embodiment, the lid is separate from the membrane cartridge. The electrodes are integral to the housing because they are relatively expensive, designed for the life of the system (e.g., 10 years), the electrical connections to the power supply must be hard wired and isolated from people for safety and certification purposes, and providing space between the electrodes and the outer and inner membrane cartridge membrane surfaces improves the prospects for providing uniform electric fields. To this last point, providing distance between the outer electrode and the outer surface, and the inner electrode and the inner surface of the membrane cartridge provides a serial electrical resistance in the form of the water that fills this gap, which improves the uniformity of current passing normal to the membrane surfaces, thereby providing better membrane cartridge performance.

In embodiments described in the literature, the housings include an inner electrode wrapped on or secured to a riser tube which also serves to drain gas which will accumulate during deionization when the flow is from the outside to the inside of the membrane cartridge. If there were no riser tube, the entire inner volume of the membrane cartridge could fill with gas produced by electrolysis at the inner electrode (hydrogen during deionization), which acts as an insulator, preventing substantial electrical conduction from the inner to outer electrode. The outer electrode is pressed against the inner housing wall with a plastic frame or net. This supporting frame or net must be very open to avoid blocking substantial electrode surface area which will reduce the electrode life. This open structure provides a relatively flexible, weak component which is susceptible to distortion if the membrane cartridge is inserted at an angle or with excessive force into the housing. This is not a serious problem for the small ERIX POU systems and membrane cartridges that have been commercialized, because the membrane cartridge mass is small and it is apparent to the service person when inserting the cartridge in the housing whether or not there is interference with the outer or inner electrodes.

Membrane cartridge life is limited, e.g., to 2 or 3 years, when treating hard water, due to formation of scale on the membrane surface, reducing its effectiveness. Thus, this cartridge must be replaced several times over the life of the ERIX POU system. To fit over the inner electrode/riser tube feature of the housing, currently available membrane cartridges have a hole in the bottom cap through which the riser tube passes. This bottom cap also has at least one o-ring on a cap nose which seals to a circular feature in the bottom of the housing to form a seal, which prevents water on the outside and inside of the membrane cartridge from mixing. The o-ring seal is very effective for providing this critical seal due to the small dimensions of the housing and the membrane cartridge cap, and the small forces at play during membrane cartridge installation and service. The small mass and dimensions of the membrane cartridge do not apply substantial forces to distort the o-ring seal to the housing, even when water enters the outer volume from one side during deionization, avoiding a breach of the o-ring seal separating incoming water being treated and deionized water exiting from the center of the membrane cartridge.

While scaling up the dimensions and mass of the membrane cartridge for industrial and municipal applications, for example to create membrane cartridges having 20-fold more bipolar membrane area than employed in the prior art cartridges, it has been determined that integrating the electrodes in the housing as described in the literature and providing effective fluid seals between the membrane cartridge and the housing bottom to prevent mixing of incoming feed water and deionized water for such designs is unreliable. In one embodiment, ERIX membrane cartridges as disclosed herein, for industrial systems, are 0.9 meter tall, 18 cm in diameter and weigh 20 kg. This size and mass is difficult to manually handle, and when inserting cartridges into housings having integral electrodes, interference with the inner and outer electrode structures is unavoidable and frequently causes their serious distortion and malfunction. Furthermore, distortions to the o-rings at the bottom of these large ERIX cells due to even small motions of the tall membrane cartridges are so great that the o-rings frequently leak, allowing incoming feed water to contaminate the deionized water exiting from the center of the membrane cartridges.

It has now been discovered that the inner and outer electrodes can be integrated with the large ERIX membrane assembly rather than in the housing, to permit the reliable assembly of large ERIX cells. Surprisingly, the wrapping of the outer electrode directly on the membrane assembly surface provides no discernable reduction in performance due to poorer current uniformity. The electrode can be tightly wrapped on the outer membrane assembly surface to provide superior resistance to distortion even if it mechanically interferes with the housing wall during insertion in the housing. The integral inner electrode runs no risk of interference with the inner wall of the membrane assembly due to its integration in the cartridge. The ERIX membrane assembly design disclosed herein has the further important advantage that rather than having a bottom cap which must seal to the housing by a re-enterable rubber (e.g., o-ring)

seal, the bottom cap may be a solid cap. The electrodes pass through the top cap to provide easy access by service engineers who maintain this large equipment. An embodiment of this large ERIX cell is described by reference to FIGS. 10A-C and FIG. 11, which serve as one non-limiting example. This description, however, is not meant to preclude other embodiments.

Figure 10A:
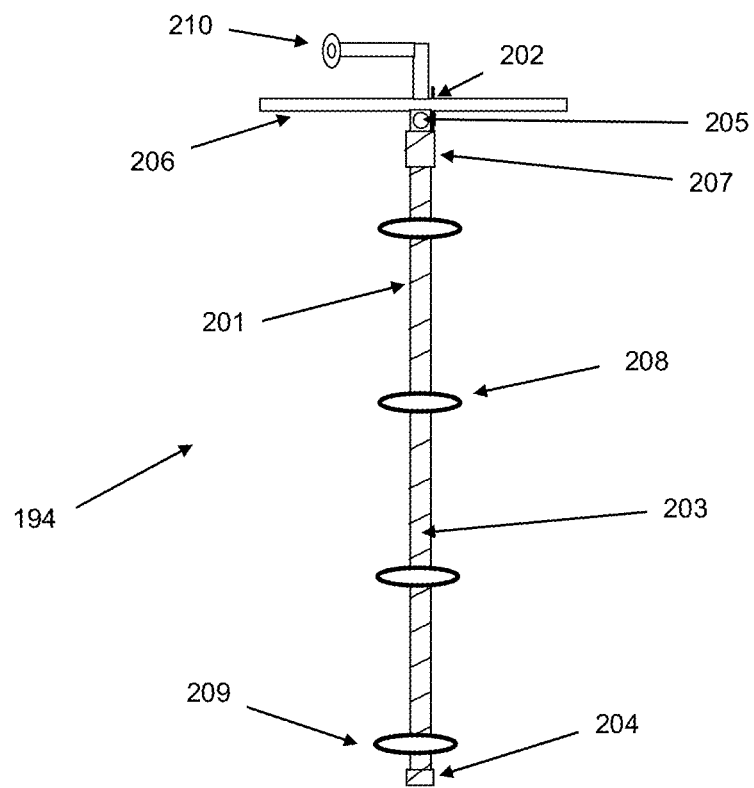
FIG. 10A is a schematic view of an inner electrode support as described herein, which is an integral part of the membrane assembly depicted in FIG. 10B.

In FIG. 10A is shown the detail for the construction of an inner electrode support assembly 194 to which the spiral wound bipolar membrane is subsequently installed and sealed. The inner electrode 201 is wound on support pipe 203 which is constructed from, e.g., a 30 inch long, 1.25 inch PVC pipe with an end cap 204 on the bottom, and plugged on the other end to prevent water from entering this pipe. Inner and outer electrode include, e.g., platinum or other noble metal catalyst coated onto, e.g., 1.5 mm titanium wire, and both electrodes are, e.g., 315 inches long. A coupling 207, e.g. 1.25 inch, is placed over the plugged pipe end, and a section of PVC pipe, e.g., 2.5 inch long, 1.25 inch joined to the coupling. Four holes 205, e.g., 0.5 inch, are drilled in the short pipe extension one inch from the end for fluid flow. A threaded hole, e.g., 1.0 inch, is created in the top-center of blind flange 206 which may be, e.g., a commercial, Schedule 80, 8 inch PVC or CPVC fitting; a short pipe is screwed into this hole to serve as the entrance-exit port for the center of the wound membrane. In the bottom-center of the blind flange is machined a cavity, e.g., 1.25 inch diameter, 0.25 inch deep, to which the inner electrode support pipe 203 is bonded using adhesive, e.g., PVC (with the four holes near the flange). One or both ends of the inner electrode 201 pass through a hole 202, e.g., 0.125 inch, in the blind flange, and this hole is sealed with a rubber gasket/compression nut or epoxy. Additionally, three rigid circular pieces 208, e.g., each 3.1 inch in diameter, having large openings for vertical water flow, are bonded at even intervals to the inner electrode support pipe 203 to provide structural support to the core net tube on which the bipolar membrane is wrapped (the core net tube inside diameter is, e.g., about 3.0 inches). When warm and under compression from high flow rates entering the outer ERIX cell volume during deionization, for example, the ERIX membrane wrap may be distorted to an oval shape—the circular pieces on the inner electrode support pipe resist this force. Except for the bottom disc 209, these circular supports 208 have large openings to pass water in both directions (up and down) during deionization and regeneration, and to install the inner electrode. The bottom disc 209 has no holes and serves to buffer the force directed at the bottom end cap when water bursts into this inner volume during regeneration, when the regeneration inlet is the center of the membrane assembly and the regeneration outlet is located at the outer cell volume.

The inner electrode support pipe 203 serves as a riser tube to remove accumulated gas if the ERIX cell is installed with the inlet-outlet-electrode connections positioned at the bottom (upside-down orientation in comparison to FIGS. 10A-C and FIG. 11). In this case, the top of the riser tube does not include cap 204, the support pipe 203 is a single pipe length without plug, coupling 207, nor the holes 205 near the blind flange 206.

Figure 10B:
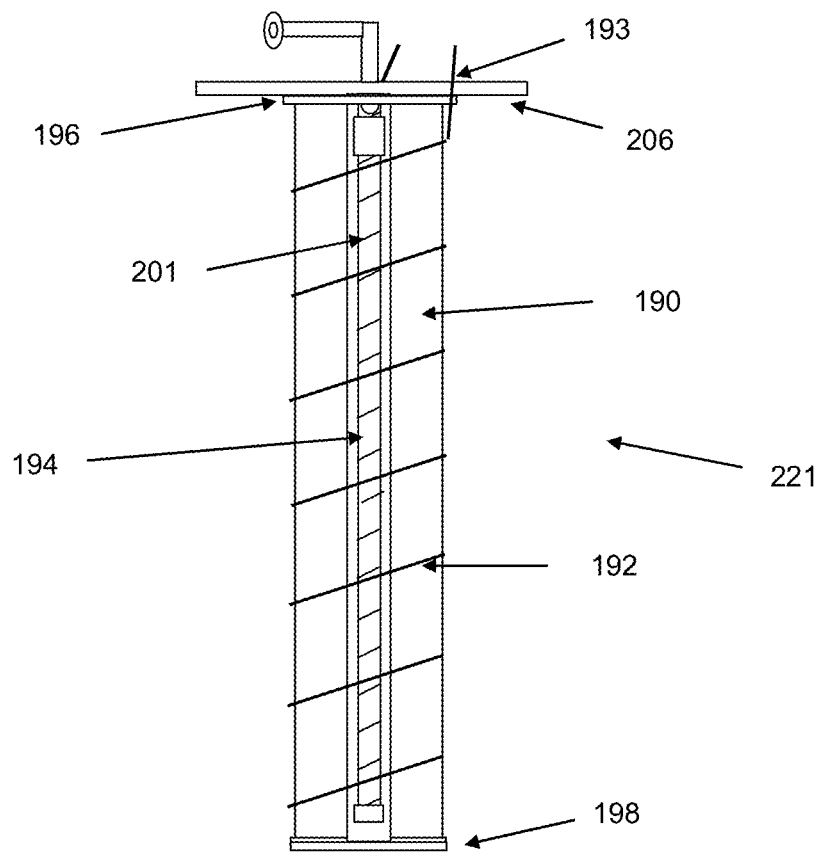
FIG. 10B is a schematic view of an embodiment of an ERIX membrane assembly as described herein, including a spiral wrapped bipolar membrane directly bonded to a blind flange on one end, and a cap on the other end, having inner and outer electrodes integral to the blind flange, which is part of the membrane assembly.

In FIG. 10B is shown an embodiment of an ERIX membrane assembly 221 as disclosed herein. Bipolar membrane, e.g., produced by Pionetics Corporation, is employed. A bipolar membrane log 190 is constructed, e.g., from 43 bipolar membrane sheets, each, e.g., 31.5 inch long and 35 inches wide, which are wound in parallel on a core net tube, e.g., 3.5 inch outside diameter, to produce a "log." This log, having an outside diameter of, e.g., 7.0 inches, is trimmed on both ends to provide, e.g., square, flat surfaces. One end of the log is secured to the blind flange 206 with for example adhesive 196, e.g., polyamide, which is first applied to the blind flange followed by inserting inner electrode support assembly 194 down the center of the bipolar membrane log. A PVC end cap 198 (custom design having an inside diameter of, e.g., 7.25 inches) is then secured to the bottom end of the membrane log with an adhesive, e.g., the same adhesive to seal this end. The outer electrode 192 is wrapped tightly on the outer surface of the bipolar membrane log with one or both ends passing through a hole 193, e.g., 0.125 inch, in the blind flange top cap.

Figure 10C:
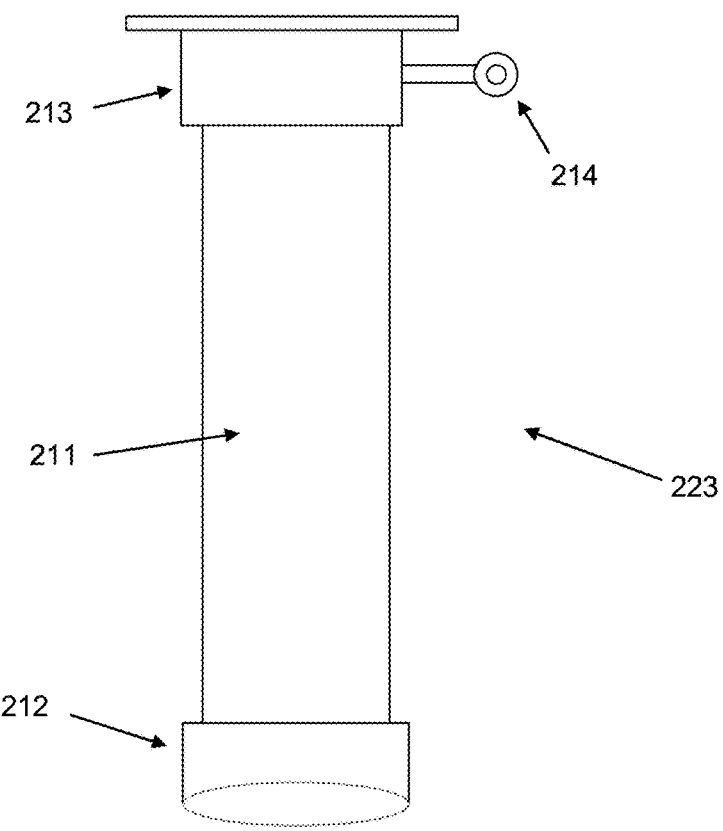
FIG. 10C is a schematic view of an ERIX housing as described herein.

An embodiment of an ERIX housing 223 into which the ERIX membrane assembly 221 in FIG. 10B may be inserted is shown in FIG. 10C. It may be assembled from, e.g., commercial, 8 inch Schedule 80 PVC or CPVC pipe and fittings. The housing may include, e.g., a 0.90 meter long pipe 211 sealed at its bottom with end cap 212. The top of the pipe is fit with a flange fitting 213. About, e.g., 1 inch below, the flange is drilled and tapped a hole, e.g., 1.0 inch, for a short pipe 214 which serves as the outer water inlet/exit. The use of PVC or CPVC is advantageous due to its flame retardancy and its rigidity. For applications in which the water or environmental temperature is greater than about 60° C., CPVC material be used.

Figure 11:
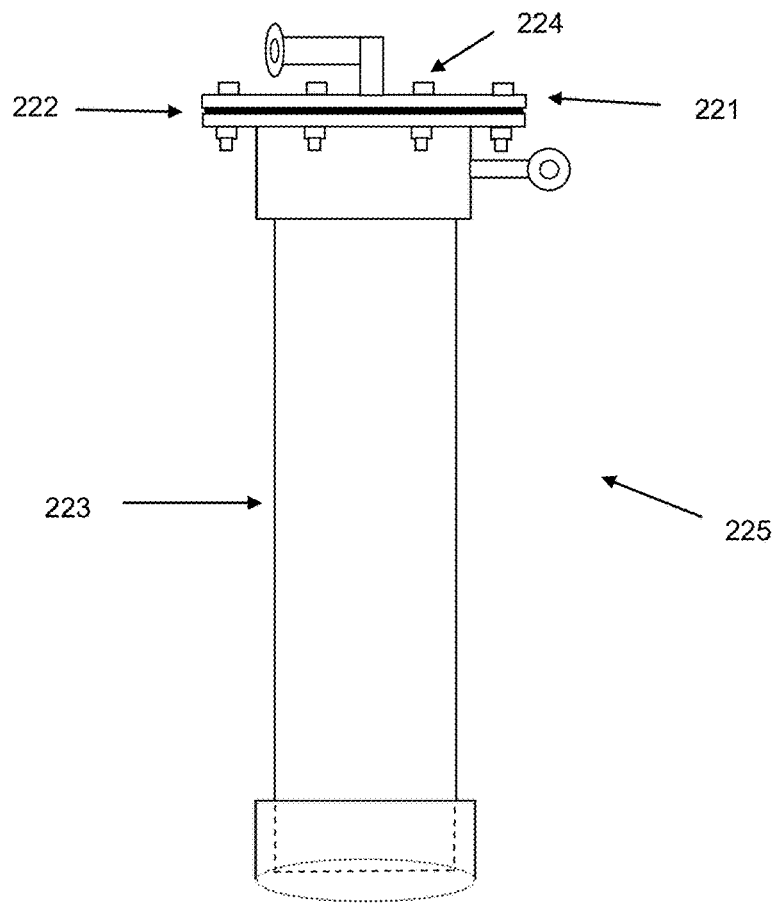
FIG. 11 is a schematic view of an ERIX cell as described herein, including the ERIX membrane assembly depicted in FIG. 10B, installed in the housing depicted in FIG. 10C.

The complete large ERIX cell 225 is shown in FIG. 11 and includes ERIX membrane assembly 221 inserted into housing 223. A re-enterable seal is provided by, e.g., an 8 inch commercial rubber gasket 222 compressed with, e.g., eight bolts 224. Optionally, large (custom) metal washers, the outer diameter equal to the outer diameter of the flanges, may be installed on the top and bottom flange surfaces through which the eight bolts are passed and tightened. This better distributes the bolt forces uniformly across the sealing surface.

Figure 12:
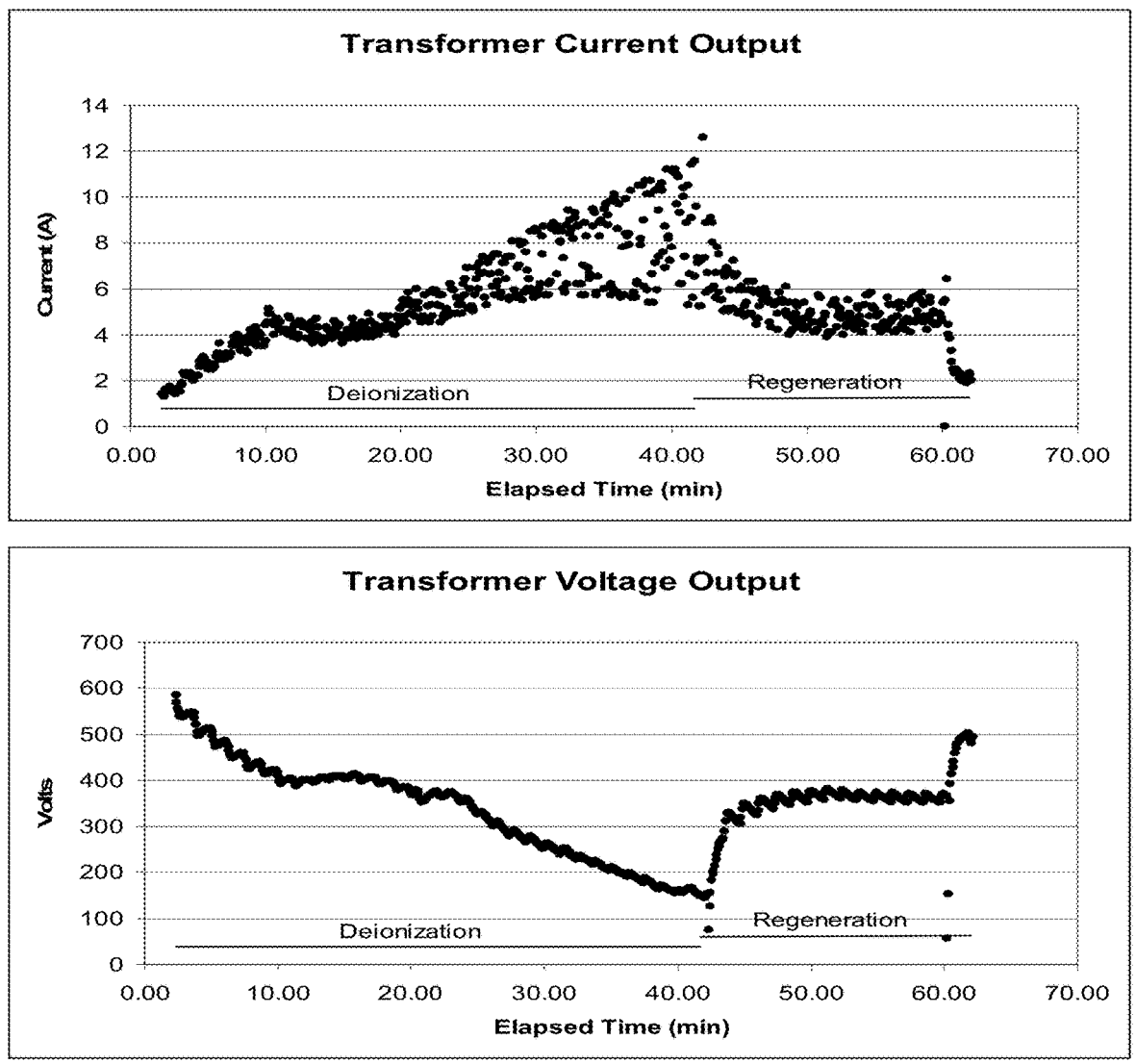
FIG. 12 shows experimental results, illustrating current, voltage and power versus time, representing an entire deionization and regeneration cycle, using the transformer as described herein having a magnetic dispersion bridge powering a large ERIX cell as depicted in FIG. 11.

The transformer described in Example 2 was used to power the large ERIX cell in FIG. 11 during a 40 minute deionization and subsequent 20 minute regeneration, and the resulting current, voltage and power versus time are plotted in FIG. 12. Over the entire 60 minute experiment the cell resistance dropped from 400 to 14 ohms (judging from the voltages and currents at 0 and 40 minutes, and $V=I*R$). This is a very large change in load resistance, but the transformer never delivered to the cell more than its design limit of about 2000 W, nor did it exceed its current limit of 11 A. This behavior results from the magnetic dispersion bridge reluctance increasing when the transformer core flux increased to levels that could lead to excessive current. In this experiment there was no external control circuit varying the voltage or current to limit current or power.

ERIX Module

A module for providing, for example, about 10 to 100 liter/minute flow rates, may be constructed from a modest number of large ERIX cells to provide an apparatus that operates continuously, with some cells in production and others in regeneration or idle. The module may be constructed on a mobile, rigid frame and may have a footprint small enough for efficient transport and installation in many work spaces. Multiple modules can be used for a given application when higher flow rates are needed, operating individually or synchronized using a master control system. Modules include a rigid frame to permit stacking for higher packing densities when multiple modules are required. The feed water for regeneration may be different from that being treated; for regeneration one desires a low incoming conductivity or TDS for optimal result.

An embodiment of the disclosed ERIX module employs a stainless steel frame on an end of which are affixed three pairs of the large ERIX cells disclosed herein, with each cell pair plumbed in parallel (e.g., the two cells in each pair are equivalent). Each cell has a flow sensor in the fluid stream which is the inlet during regeneration to measure regeneration water volumes. Conductivity, temperature and pressure sensors are optionally positioned in the two feed fluids (the fluids being treated, and that used for regeneration). In the product output stream are optionally placed flow rate, conductivity, temperature and pressure sensors. On the other end of the module frame, hydraulically isolated from the cells, valves and plumbing, are located six ERIX cell control circuits, one for each cell, a master control system or computer, and one or more transformers, such as the transformers disclosed herein. In some cases it may be advantageous to provide one transformer for each ERIX cell. It may be advantageous, however, to power two or more cells with a proportionately larger transformer. For example, one may use six 3000 W transformers to power the module's six cells, or three 6000 W transformers to power pairs of cells, or one 18,000 W transformer to power all six cells in the ERIX module. The number of transformers employed in a module will include consideration of transformer size, heat generation and cost. The control circuits dedicated to each cell are slaves to the master control system. These slave control circuits follow instructions from the master control system to provide the desired cell power, activate appropriate valves and monitor sensors. The master control system orchestrates the operation of the six cells and all valves in the module, and reports results and status to the operator.

Pairs of cells are plumbed in parallel to reduce pressure drop and thus to provide higher flow rates. At any one time, two pairs of ERIX cells are operated in series to provide two deionization stages to more completely utilize the ion exchange capacity of the bipolar membrane prior to their regeneration. The plumbing schematic of this embodiment is shown in FIG. 13. The third pair of cells is in regeneration. Cell pairs that have completed regeneration move into the second, or polishing, deionization position by the opening and closing of appropriate valves. Cell pairs that have completed the polishing step move into the first, or coarse, deionization position. When the coarse deionization stage is complete, these cells are prepared for the regeneration stage by: 1) an optional step to return cell contents to the treated water feed tank (e.g., if these contents are of sufficient value) with the continued application of deionization power to hold the capacitively bound ions near the membrane surface; 2) turning off the coarse deionization cell power and immediately flowing a prescribed regeneration feed water volume (on the order of a void volume) in the regeneration direction to substantially remove the capacitively bound ions which are released from the cell; 3) powering the cell pair with regeneration polarity; 4) after some prescribed time, e.g., 75 seconds in this example, initiating a first regeneration burst, for example 5 liters, to discharge the first rejected chemically exchanged ions from the cell pair, and 5) thereafter at intervals, e.g., 75 second intervals, bursting water in the regeneration direction to complete the regeneration. In this way, the module provides continuous production from four ERIX cells while two cells are regenerating. In the present example, the time each cell pair serves in a given stage is, e.g., about 5 to about 40 minutes, for example, about 10 to about 30 minutes.

Also provided herein is an ERIX module or similar system that may be operated exclusively in the capacitive mode, i.e., with the bipolar membranes substantially saturated with exchanged ions and not employing the ERIX chemical regeneration step using the bipolar membrane water-splitting reaction. An apparatus for this operation includes at least two sets of ERIX cells, one set deionizing incoming solution by application of deionization polarity, the other set releasing the ions previously bound by turning off the cell power and using the regeneration feed water to discharge these ions to the drain. Such a process does not use regeneration cell power (a cost savings), and the deionization and regeneration times are short, in some embodiments providing a useful production rate. A drawback to such a device is the difficulty in obtaining high reductions of incoming ion concentrations (e.g., 90-99%) without the use of a supplemental deionization process, because the working capacity for ion removal during each deionization step is low. Further, it may be challenging to obtain high water recoveries (low water waste) because to discharge the released ions during the regeneration step requires a substantial water volume, and this rejection step will have to occur very frequently. Nevertheless, such a capacitive device employing bipolar membrane rather than the carbon or other electrodes described in the literature, either working alone or in conjunction with an ERIX system or other process, is provided herein.

Very Large ERIX (VL-ERIX) Apparatus

For fluid deionization applications of massive scale, for example lake pollution abatement or very large industrial processes, very large ERIX (VL-ERIX) apparatus useful for these applications includes hundreds or thousands of ERIX cells as disclosed herein. Rather than plumbing two cells in series as in the ERIX module disclosed herein, VL-ERIX apparatus are constructed from many more ERIX cells plumbed in parallel for each stage. For example, 100 ERIX cells may be plumbed in parallel for the polishing (second) deionzation stage, another 100 cells plumbed in parallel for the coarse (first) deionization stage, and a further 100 cells plumbed in parallel for the regeneration stage. This concept extends to any number of stages, two or more stages, but three stages are an advantageous embodiment due to pressure drop considerations. Each ERIX cell has a dedicated power supply to optimize performance. By dedicated power supply is meant a control board which provides the appropriate voltage and current for the cell. As for modules, cells in VL-ERIX systems may share transformers, such as the transformers disclosed herein with constant power output and utilizing the magnetic dispersion bridge to prevent over-current damage to the power supply.

Each stage, e.g., including 100 or more cells, is hydraulically driven by only six valves. Thus the entire apparatus would include only about 22 large valves (including valves for cleaning operations) to drive 300 ERIX cells. In contrast, the use of ERIX modules as disclosed herein to provide the performance of the VL-ERIX apparatus including 300 cells would require, e.g., 50×22 valves, or 1,100 small valves. This translates into important cost and reliability (avoidance of leaks and valve operation) benefits for this VL-ERIX architecture. Operation is identical to that described for the ERIX module and as shown in FIG. 13 (in which case each cell pair in FIG. 13 represents 100 parallel plumbed cells), with sets of 100 ERIX cells switching from a second (polishing) deionzation stage to a first (coarse) deionization stage, and then to the regeneration stage, providing continuous water treatment production. The power supplies are segregated from the ERIX cells and plumbing to prevent risk of water exposure.

The following examples are intended to illustrate, but not limit, the invention.

EXAMPLES

Example 1

Figure 7:
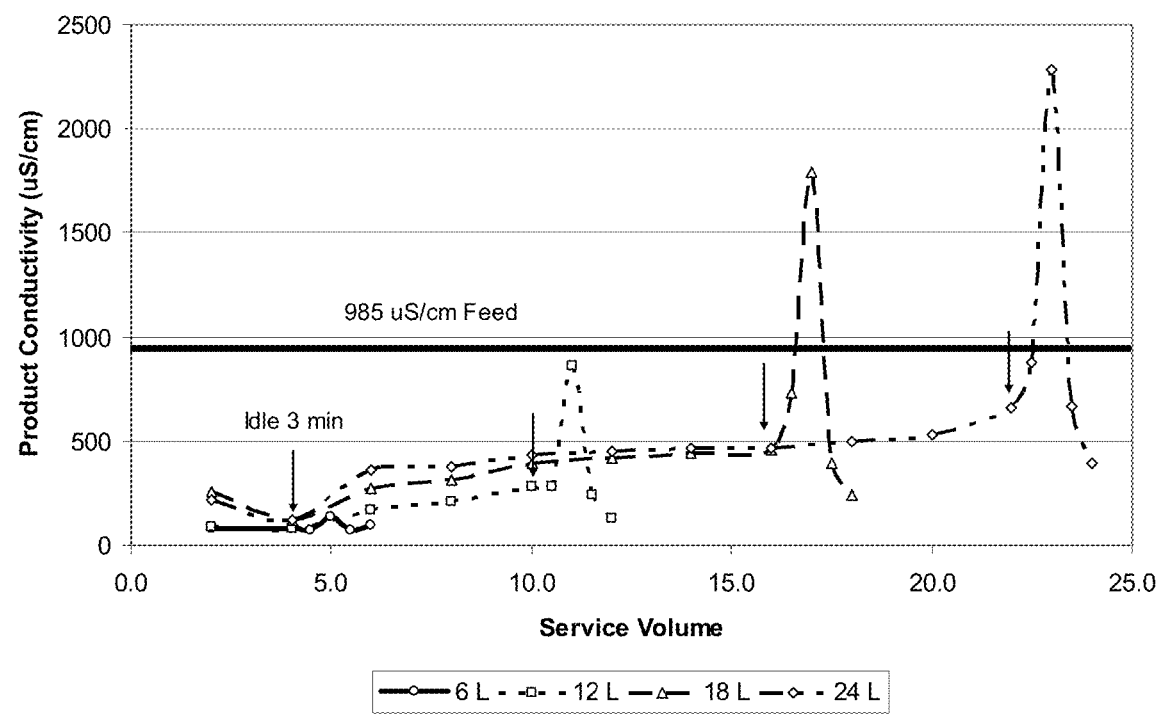
FIG. 7 shows experimental results illustrating the increased ion extraction from intentionally exploited capacitive deionization.

An incoming solution was prepared from calcium chloride, sodium bicarbonate and magnesium sulfate having a conductivity of 950 µS/cm. This was deionized in four experiments employing increasing service volumes by a LINX® 140 drinking water system, produced by Pionetics® Corporation, which comprises two small LINX 100 TDS cartridges prepared with textured bipolar membrane (LINX and Pionetics are trademarks of Pionetics Corporation). Service volumes of 6, 12, 18 and 24 liters were continuously deionized at 1.9 liters/minute until 2.0 liters before the deionization step is programmed to finish (and regeneration to begin), when deionization flow and power are shut off for 3 minutes. 2.0 liter volumes were collected and their conductivities recorded. After the 3 minute interruption, deionization flow and power resume with the collection of four 0.5 liter volumes of production water which conductivities are also measured. The results are plotted in FIG. 7. The spike in conductivity observed after the 3 minute interruption, indicated by the four arrows for each experiment, relative to the baseline conductivity interpolated from the product water conductivities measured before the interruption and near the end of the deionization, is a direct measure of the ions which were capacitively held by the bipolar membrane rather than chemically ion exchanged. For the 24 liter service volume experiment, the capacitively held ions constitute 11% of the total ions removed from solution, a substantial contribution.

This large capacitive deionization effect observed in Example 1 cannot be explained by the small surface area of the inner and outer electrodes in an ERIX cell between which lie 50 to 100 layers of bipolar membrane having many orders of magnitude more surface area. Although not wishing to be bound by theory, the inventors hypothesize that this large capacitive deionization effect as the ERIX membrane becomes saturated with ions is due to a the accumulation of ions $H^+_{w-s}$ and $OH^-_{w-s}$ formed from the water-splitting reaction within the bipolar membrane and which require counter-ions, ions of opposite charge, to balance their charge at the atomic level. The rapid release of the capacitively held ions suggests that this effect is concentrated at or near the surface of the membrane, however it may also occur in the bulk of the membrane. Regardless, recognition of this capacitive deionization component of ERIX cell operation provides a means to extend the deionization step of the ERIX process, thereby increasing production rates and decreasing waste volume as a proportion of the total water volume treated.

This discovery has led to important ERIX process improvements to efficiently discharge the capacitively held ions to the waste or discharge stream as a part of the regeneration process rather than allowing these released ions to pass to the product stream. In a first embodiment, in an ERIX cell comprising a bipolar or water-splitting membrane, a first regeneration burst occurs soon after the deionization voltage is removed and before the regeneration voltage is applied. The volume of this burst is selected to discharge the bulk of ions released when the deionization voltage is removed. The discharge volume is preferably 1 to 3-fold the cartridge void volume, a void volume being the water contained within the ERIX cartridge between the membrane layers. Discharging this high concentration of ions as part of the regeneration process from the cell soon after deionization voltage is shorted avoids these ions inhibiting the diffusion of the chemically exchanged ions which are subsequently rejected during ERIX system regeneration. Preferably the discharge occurs after 1 to 30 seconds with the electrode power turned off such that the voltage across the electrodes is less than about 40 V (the electrode voltage decays fairly slowly due to the capacitive component of the cell). Diffusion of ions out of the membrane is faster when working against a low bulk concentration of ions. This burst to the discharge stream after deionization voltage is turned off and before regeneration voltage is applied is in contrast to the prior art operation of ERIX cells in which substantial time, for example 1 minute, is passed after applying regeneration power before the first regeneration burst of fluid to the discharge stream occurs. This delay allows the water-splitting reactions (5)-(8) to drive substantial ion exchange before discharging regeneration waste water.

In a second embodiment, in an ERIX device comprising water-splitting membranes, the capacitively held ions are periodically released during the deionization step by: 1) stopping flow and turning off voltage, 2) waiting for a time (e.g., seconds or tens of seconds), 3) discharging the ions in the ERIX cartridge void volume between membrane layers in the regeneration flow direction a volume of water to push the capacitively held ions, now in the fluid between the membranes, substantially out of the ERIX cell, 4) re-applying deionization voltage and production flow, and 5) waiting for a time or production volume before repeating this five-step process. In this manner, the duration of the deionization step can be extended to increase production and reduce water waste, for example. The timing of each production interruption may be triggered based on time, volume as measured by a flow sensor, by the cell voltage-current signature, or result from some other sensor which may be monitoring incoming or production water characteristics, such as conductivity or a specific ion sensor.

Example 2

The transformer's magnetic core is fabricated from stamped electrical steel sheets, approximately 0.8 mm thick. In a preferred embodiment illustrated in FIG. 8 the core is formed as a rectangle, having outside dimensions (from the perspective of FIG. 8) of 40 cm tall×22 cm wide and a core cross-section of 7 cm×7 cm. The core material is procured in the form of stamped sleeves in two shapes, "C" and "E", so that they interlock as they are laid one on top of the other as is the standard procedure for assembling transformer cores. The sleeves are stamped such that the steel grain direction is parallel to the magnetic flux orientation. This cross-sectional area provides a suitably uniform flux distribution and size for the subsequent winding around the rectangular core of two primary and two secondary coils as shown. This structure is in sharp contrast to the conventional design for a low frequency transformer in which both the primary and secondary coils are wrapped around a central cylindrical core, around which is then installed a rectangular magnetic structure to surround in two dimensions the coils. The transformer of the present invention can thus provide high voltages (e.g., 700 V) by employing more turns in each secondary coil, AND double the current (e.g., 20 A) by drawing current from two primary and two secondary coils. The two primary and secondary coils are wrapped in opposite directions on the core so that currents add. As explained above, an ERIX system needs high voltage during some periods, and high currents during other periods. The rectangular magnetic core of the present invention with its two primary and two secondary coils further includes a magnetic dispersion bridge which limits the secondary coil current output to a pre-determined value. This magnetic bridge is constructed from the same electrical steel sheet material used for the core (about 0.8 mm thick). As for the core, the steel sheet grain orientation is oriented parallel to the magnetic flux direction to obtain the higher permeability (grain orientation in FIG. 8 is left-right). The bridge material stamped sleeves are each 7 cm deep and 8 cm wide (from the perspective of FIG. 8) so that in depth they have the same dimension as for the core cross-section, and in width they exactly span the open space between the two vertical core legs, leaving virtually no air between the magnetic dispersion bridge and the inner wall of the core. In designing a transformer of the present invention, one adds or removes magnetic material sleeves to construct the bridge. In this example, 10 sleeves are used to create a bridge which is 0.8 cm in height. After much testing, this was determined to provide a transformer able to survive a short circuit at the load for at least one hour in the present invention. Once the design is fixed, the transformer is coated with a commercial thermoset resin, for example KEMIEPDX EL Black supplied by POOLKEMIE Liquid Rubbers and Resins, to fix all components in position and seal from water incursion.

Although the foregoing invention has been described in some detail by way of illustration and examples for purposes of clarity of understanding, it will be apparent to those skilled in the art that certain changes and modifications may be practiced without departing from the spirit and scope of the invention, which is delineated in the appended claims. Therefore, the description should not be construed as limiting the scope of the invention.

All publications, patents, and patent applications cited herein are hereby incorporated by reference in their entireties for all purposes and to the same extent as if each individual publication, patent, or patent application were specifically and individually indicated to be so incorporated by reference.

We claim:

1. An electrochemical cell for reduction of the ion concentration of an influent solution, comprising:
   (a) a housing comprising first and second ends, an end cap on the first end of the housing, and a flange fitting on the second end of the housing; and
   (b) a bipolar membrane assembly comprising:
      (i) an inner electrode wound around an inner electrode support, wherein at least one end of said inner electrode passes through a blind flange,
      (ii) a bipolar membrane wound around the electrode support and comprising an interior volume, wherein the bipolar membrane is sealed on one end and secured on the other end to the blind flange; and
      (iii) an outer electrode wound around the bipolar membrane, wherein at least one end of said outer electrode passes through the blind flange,
   wherein said inner electrode support comprises openings that allow liquid to pass from the interior volume of the spiral wound bipolar membrane to the exterior of the cell via a hole in the blind flange.

2. A system for treatment of an influent solution, comprising the electrochemical cell of claim 1 and a transformer, wherein the transformer comprises a plurality of voltage output steps that are utilized one at a time,
   wherein the transformer comprises primary and secondary coils wound around a magnetic core, wherein said secondary coils comprise output winding with conductor diameters for each secondary output winding which are selected to provide similar electrical resistance.

3. A system for the continuous treatment of an influent solution comprising at least two stages, wherein each stage comprises at least one electrochemical cell comprising a bipolar membrane, wherein during operation:
   (a) a first stage comprises deionizing an influent solution; and
   (b) a second stage comprises regeneration or an idle mode following regeneration,
   wherein when a service time is reached in response to time, volume, or another parameter, the first stage begins regeneration as the second stage begins deionization.

4. The system of claim 3, wherein the electrochemical cell comprises:
   (a) a housing comprising first and second ends, an end cap on the first end of the housing, and a flange fitting on the second end of the housing; and
   (b) a bipolar membrane assembly comprising:
      (i) an inner electrode wound around an inner electrode support, wherein at least one end of said inner electrode passes through a blind flange,
      (ii) a bipolar membrane wound around the electrode support and comprising an interior volume, wherein the bipolar membrane is sealed on one end and secured on the other end to the blind flange; and
      (iii) an outer electrode wound around the bipolar membrane, wherein at least one end of said outer electrode passes through the blind flange,
   wherein said inner electrode support comprises openings that allow liquid to pass from the interior volume of the spiral wound bipolar membrane to the exterior of the cell via a hole in the blind flange.

5. The system of claim 3, further comprising a transformer,
   wherein the transformer comprises a plurality of voltage output steps that are utilized one at a time,
   wherein the transformer comprises primary and secondary coils wound around a magnetic core, wherein said secondary coils comprise output winding with conductor diameters for each secondary output winding which are selected to provide similar electrical resistance.

6. The system of claim 3, comprising six or fewer valves for each stage.

7. The system of claim 3, wherein a flow rate of at least 5 liters per minute is provided for each electrochemical cell in each stage.

8. The system of any of claim 3, wherein the service time is about 5 minutes to about 60 minutes.

* * * * *